United States Patent
Liboiron-Ladouceur et al.

(10) Patent No.: US 9,485,048 B2
(45) Date of Patent: Nov. 1, 2016

(54) METHODS AND DEVICES FOR SPACE-TIME MULTI-PLANE OPTICAL NETWORKS

(71) Applicants: The Royal Institution for the Advancement of Learning / McGill University, Montreal (CA); Scuola Superiore Sant'Anna, Pisa (IT)

(72) Inventors: Odile Liboiron-Ladouceur, Montreal (CA); Md. Shafiqul Hai, Montreal (CA); Pier Giorgio Raponi, Pisa (IT); Nicola Andriolli, Rovigo (IT); Isabella Cerutti, Pisa (IT); Piero Castoldi, Parma (IT)

(73) Assignees: The Royal Institution for the Advancement of Learning/McGill University, Montreal (CA); Scuola Superiore Sant'anna, Pisa (IT)

( * ) Notice: Subject to any disclaimer, the term of this patent is extended or adjusted under 35 U.S.C. 154(b) by 0 days.

(21) Appl. No.: 13/913,652

(22) Filed: Jun. 10, 2013

(65) Prior Publication Data
US 2013/0330076 A1    Dec. 12, 2013

Related U.S. Application Data

(60) Provisional application No. 61/657,067, filed on Jun. 8, 2012.

(51) Int. Cl.
  *H04J 14/00* (2006.01)
  *H04J 14/02* (2006.01)
  (Continued)

(52) U.S. Cl.
  CPC .......... *H04J 14/0223* (2013.01); *H04J 14/02* (2013.01); *H04J 14/0267* (2013.01); *H04J 14/08* (2013.01);
  (Continued)

(58) Field of Classification Search
  None
  See application file for complete search history.

(56) References Cited

U.S. PATENT DOCUMENTS 5,589,967 A * 12/1996 Auffret ........................ 398/54
5,864,414 A *  1/1999 Barnsley et al. ............ 398/71
(Continued)

OTHER PUBLICATIONS

Liboiron-Ladouceur: "Low-Power, Transparent Optical Network Interface for High Bandwidth Off-Chip Interconnects", Opt. Express, vol. 17, No. 8, Apr. 2009, pp. 6550-6561.*
(Continued)

*Primary Examiner* — Li Liu
(74) *Attorney, Agent, or Firm* — The Law Office of Michael E. Kondoudis

(57) ABSTRACT

Scalability and energy efficiency are key issues in data centers imposing tight constraints on the networking infrastructure connecting the servers. Optical interconnection mitigates electronic limitations but the additional flexibility offered by WDM and datarate across a data center interconnection network requires architectural design, photonic technologies, and operating strategies be selected and optimized to meet power consumption requirements. Multi-plane architectures based upon space-wavelength domain architectures have been proposed to overcome scalability limitations. It would be beneficial to extend space and time switching domains with the wavelength domain for additional capacity to increase throughput as well as providing same electro-optic interface. Accordingly, the inventors have established space-time domain interconnection network architectures with wavelength domain overlay overcoming power consumption issues, especially at low utilization, by exploiting all-optical implementations with active elements which act simultaneously as a switch and an amplifier, and the possibility to remain in an idle state when unused.

12 Claims, 18 Drawing Sheets

(51) Int. Cl.
*H04Q 11/06* (2006.01)
*H04J 14/08* (2006.01)
*H04Q 11/00* (2006.01)

(52) U.S. Cl.
CPC .......... *H04Q 11/0001* (2013.01); *H04Q 11/06* (2013.01); *H04J 2203/0007* (2013.01); *H04J 2203/0008* (2013.01); *H04J 2203/0091* (2013.01); *H04Q 2011/0033* (2013.01); *H04Q 2201/02* (2013.01)

(56) References Cited

U.S. PATENT DOCUMENTS

| | | | |
|---|---|---|---|
| 6,141,127 A * | 10/2000 | Boivin et al. | 398/92 |
| 6,243,178 B1 * | 6/2001 | Suemura et al. | 398/56 |
| 6,307,658 B1 * | 10/2001 | Chiaroni et al. | 398/183 |
| 6,356,371 B1 * | 3/2002 | Chiaroni et al. | 398/102 |
| 6,452,681 B1 * | 9/2002 | Carver et al. | 356/450 |
| 6,456,752 B1 * | 9/2002 | Dragone | 385/17 |
| 6,535,313 B1 * | 3/2003 | Fatehi et al. | 398/101 |
| 6,542,655 B1 * | 4/2003 | Dragone | 385/17 |
| 6,711,313 B2 * | 3/2004 | Takiguchi et al. | 385/15 |
| 6,771,905 B1 * | 8/2004 | Bortz | 398/45 |
| 6,956,998 B2 * | 10/2005 | Shahar et al. | 385/50 |
| 7,245,829 B1 * | 7/2007 | Sindile | 398/45 |
| 7,474,827 B2 * | 1/2009 | Handelman | 385/122 |
| 2002/0057861 A1 * | 5/2002 | Ge et al. | 385/16 |
| 2003/0231885 A1 * | 12/2003 | Kato et al. | 398/98 |
| 2004/0228629 A1 * | 11/2004 | Harris et al. | 398/79 |
| 2005/0013568 A1 * | 1/2005 | Handelman | 385/122 |
| 2006/0115272 A1 * | 6/2006 | Minato et al. | 398/77 |
| 2006/0165070 A1 * | 7/2006 | Hall et al. | 370/369 |
| 2007/0223921 A1 * | 9/2007 | Sone et al. | 398/45 |
| 2009/0003827 A1 * | 1/2009 | Kai et al. | 398/45 |

OTHER PUBLICATIONS

Liboiron-Ladouceur et al: "Energy-Efficient Design of a Scalable optical Multiplane Interconnection Architecture", IEEE J. Sel. Top. Quantum Electron., vol. 17, Mar./Apr. 2011, pp. 377-383.*
Farrington et al., "HELIOS: A Hybrid Electrical/Optical Switch Architecture for Modular Data Centers", 2010, ACM SIGCOMM Computer Communication Review, pp. 339-350, vol. 40, No. 4, Association for Computing Machinery.
Chen et al., "Exploring the Design Space of Power-Aware Opto-Electronic Networked Systems", Proceedings of the 11th International Symposium on High-Performance Computer Architecture, Mar. 2005, pp. 120-131, Institute of Electrical and Electronics Engineers Computer Society, USA.
Tucker, "The Role of Optics and Electronics in High-Capacity Routers" Journal of Lightwave Technology, Dec. 2006, pp. 4655-4673, vol. 24, No. 12, Institute of Electrical and Electronics Engineers, USA.
Gaudino et al., "Can Simple Optical Switching Fabrics Scale to Terabit per Second Switch Capacities?" Journal of Optical Communications and Networking, Aug. 2009, pp. B56-B69, vol. 1, No. 3, The Optical Society of America and the Institute of Electrical and Electronics Engineers, USA.
Raponi et al., "Two-Step Scheduling Framework for Space-Wavelength Modular Optical Interconnection Networks", IET Communications, pp. 2155-2165, vol. 14, Issue 18, The Institution of Engineering and Technology, United Kingdom.
Liboiron-Ladouceur et al., "A Scalable Space-Time Multi-Plane Optical Interconnection Network using Energy-Efficient Enabling Technologies" Journal of Optical Communications and Networking, Aug. 2011, pp. A1-A11, vol. 3, No. 8, The Optical Society of America and the Institute of Electrical and Electronics Engineers, USA.
Albores-Mejia et al., "Monolithic Multistage Optoelectronic Switch Circuit Routing 160 Gb/s Line-Rate Data", Journal of Lightwave Technology, Oct. 15, 2010, pp. 2984-2992, vol. 28, No. 20, Institute of Electrical and Electronics Engineers, USA.
Liboiron-Ladouceur et al.,"The Data Vortex Optical Packet Switched Interconnection Network" Journal of Lightwave Technology, Jul. 1, 2008, pp. 1777-1789, vol. 26, No. 13, Institute of Electrical and Electronics Engineers, USA.
Liboiron-Ladouceur et al., "Optimization of a Switching Node for Optical Multistage Interconnection Networks", IEEE Photonics Technology Letters, Oct. 15, 2007, pp. 1658-1660, vol. 19, No. 20, Institute of Electrical and Electronics Engineers, USA.
Hemenway et al., "Optical-Packet-Switched Interconnect for Supercomputer Applications", Journal of Optical Networking, Dec. 2004, pp. 900-913, vol. 3, No. 12, The Optical Society of America, USA.
Wonfor et al., "Large Port Count High-Speed Optical Switch Fabric for Use Within Datacenters", Journal of Optical Communications and Networking, Aug. 2011, pp. A32-A39, vol. 3, No. 8, The Optical Society of America and the Institute of Electrical and Electronics Engineers, USA.
Castoldi et al., "Energy-Efficient Switching in Optical Interconnection Networks", 13th International Conference on Transparent Optical Networks, Jun. 2011, pp. 1-4, Institute of Electrical and Electronics Engineers, USA.
Lin et al., "Capacity Scaling in a Multihost Wavelength-Striped SOA-based Switch Fabric", Journal of Lightwave Technology, Mar. 2007, pp. 655-663, vol. 25, No. 3, Institute of Electrical and Electronics Engineers, USA.
Pepeljugoski et al., "Towards Exaflop Servers and Supercomputers: The Roadmap for Lower Power and Higher Density Optical Interconnects", 36th European Conference and Exhibition on Optical Communication, Sep. 2010, pp. 1-14, Institute of Electrical and Electronics Engineers, USA.
Cho et al., "Power Comparison Between High-Speed Electrical and Optical Interconnects for Interchip Communication", Journal of Lightwave Technology, Sep. 2004, pp. 2021-2033, vol. 22, No. 9, Institute of Electrical and Electronics Engineers, USA.
Tai et al., "Dynamic Range and Switching Speed Limitations of an NxN Optical Packet Switch Based on Low-Gain Semiconductor Optical Amplifiers", Journal of Lightwave Technology, Apr. 1996, pp. 525-533, vol. 14, No. 4, Institute of Electrical and Electronics Engineers, USA.

* cited by examiner

METHODS AND DEVICES FOR SPACE-TIME MULTI-PLANE OPTICAL NETWORKS

CROSS-REFERENCE TO RELATED APPLICATIONS

This patent application claims the benefit of U.S. Provisional Patent Application 61/657,067 filed Jun. 8, 2012 entitled "Method and Apparatus For Energy Efficient Implementation of Scalable Optical Interconnection Architectures", the entire contents of which are included by reference.

FIELD OF THE INVENTION

This invention relates to optical interconnection networks and more particularly to optical interconnection networks exploiting space-time-wavelength domains with reduced power consumption.

BACKGROUND OF THE INVENTION

Data centers are facilities that store and distribute the data on the Internet, which with an estimated 100 billion plus web pages on over 100 million websites means they contain a lot of data. With almost two billion users accessing these websites, including a growing amount of high bandwidth video, the volume of data being uploaded and downloaded every second on the Internet is massive. At present the compound annual growth rate (CAGR) for global IP traffic between users is between 40% based upon Cisco's analysis (see http://www.cisco.com/en/US/solutions/collateral/ns341/ns525/ns537/ns705/ns827/white_paper_c11-481360_ns827_Networking_Solutions_White_Paper.html) and 50% based upon the University of Minnesota's Minnesota Internet Traffic Studies (MINTS) analysis. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via data centers and accordingly between data centers and within data centers so that these IP traffic flows must be multiplied many times to establish the total IP traffic flows. Data centers are filled with tall racks of electronics surrounded by cable racks where data is typically stored on big, fast hard drives. Servers are computers that take requests and move the data using fast switches to access the right hard drives. Routers connect the servers to the Internet. At the same time as applications such as cloud computing increase computing platforms are no longer stand alone systems but homogenous interconnected computing infrastructures hosted in massive data centers known as warehouse scale computers (WSC) which provide ubiquitous interconnected platforms as a shared resource for many distributed services with requirements that are different to the traditional racks/servers of data centers.

At the same time as requiring a cost-effective yet scalable way of interconnecting data centers and WSCs internally and to each other most datacenter and WSC applications are provided free of charge such that the operators of this infrastructure are faced with the challenge of meeting exponentially increasing demands for bandwidth without dramatically increasing the cost and power of their infrastructure. Further consumers' expectations of download/upload speeds and latency in accessing content provide additional pressure.

As if these issues were not enough the required growth in volumes of data handled, reduced latency, increased speed, and reduced end-user cost are being jeopardized by the current architectural design trend for such data centers to be built in a modular manner exploiting low-cost commodity servers, rather than expensive high-end servers, see for example Barroso et al in "Web Search for a Planet: The Google Cluster Architecture" (IEEE Micro, Vol. 23, pp. 22-28) and Greenberg et al in "Towards a Next Generation Data Center Architecture: Scalability and Commoditization" (Proc. ACM Workshop on Programmable Routers for Extensible Services of Tomorrow (PRESTO08), pp. 57-62). Whilst this approach allows for tasks to be parallelized and a basic predictable performance to be delivered to users this performance is typically well below the peak performance of the servers, see for example Barroso et al in "The Case for Energy-Proportional Computing" (Computer, Vol. 40, pp. 33-37), and average approximately 20-30%.

However, whilst server and data center sizes are increasing, the power being drained by these servers and data centers is growing even faster. Whilst computational performance improvements increase approximately 200% every 2 years, energy efficiency only improves at present at approximately 100% every 2 years. Accordingly, the overall power consumption of each server is increasing at approximately 20% per annum, see for example Brill in "The Invisible Crisis in the Data Center: The Economic Meltdown of Moore's Law" (White Paper, Uptime Institute, 2007) and Humphreys et al in "The Impact of Power and Cooling on Data Center Infrastructure" (International Data Group, Market Research Document 201722, 2006). In fact, the acquisition cost of a server is now lower than the operational cost due to its energy consumption, see for example Brill and Pepeljugoski et al in "Towards Exaflop Servers and Supercomputers: The Roadmap for Lower Power and Higher Density Optical Interconnects" (Proc. $36^{th}$ Eur. Conf. on Optical Communication, 2010, pp. 1-14). Koomey in "Growth in Data Center Electricity use 2005 to 2010" (Analytics Press, 2011, http://www.analyticspress.com/datacenters.html) estimated that electricity consumption in global data centers in 2010 accounted for between 1.1% and 1.5% of total electricity use globally, and between 1.7 and 2.2% for the US. At 300 TWh/year consumption and 50% generation—provisioning efficiency this represents approximately 600 TWhr of generated electricity.

Accordingly, scalability and energy efficiency have become key issues in data centers and are imposing tight constraints on the networking infrastructure connecting the numerous servers. Statistics report that about 10-20% of the equipment budget, see for example Greenberg, and about 5% of the power consumption in data centers is due to the networking infrastructure, see for example "Energy Star Program: Report to Congress on Server and Data Center Energy Efficiency" (US Environmental Protection Agency, 2007); Pelle et al in "Understanding and Abstracting Total Data Center Power" (Proc. Workshop on Energy Efficient Design, 2009); and Koomey. When taken in absolute terms, this amount of power consumed by the networking infrastructure is non-trivial representing globally the output of several tens of 1000 MW power stations and is destined to grow with the continued scaling of data centers in terms of capacity, number of servers, reduced latency, and increased access/transmissions speeds.

As such, this scalability with respect to the number of interconnected servers, as well as with the inter-server transmission data rate, and the overall power consumption are stretching the limits of today's interconnection networks based on electronics leading to optical (photonic) interconnection techniques being exploited, see for example Miller in "Device Requirements for Optical Interconnects to Silicon Chips" (Proc. IEEE, Vol. 97, pp. 1166-1185). The challenge to be addressed with any interconnection solution is to interconnect a large number of servers according to dynamically changing communication patterns, so that a large amount of bandwidth can be offered when and where required. This requires the design of high throughput and scalable architectures for the interconnection networks, with an energy consumption limited and proportional to the utilization of the network, see for example Barroso; Soteriou et al in "Exploring the Design Space of Self-Regulating Power-Aware On/Off Interconnection Networks" (IEEE Trans. Parallel Distrib. Syst., Vol. 18, pp. 393-408); and D. Abts et al in "Energy Proportional Data Center Networks" (Proc. 37th Ann. Int. Symp. Computer Architecture, 2010, pp 0.338-347).

Accordingly, the introduction of optical solutions into interconnection networks has been proposed to mitigate the issues related to electronic limitations in a similar manner as optical solutions have already mitigated limitations in high data rate long haul transmission, fanout in Fiber-to-the-Home (FTTH) applications, and are addressing evolving 40 Gb/s and 100 Gb/s point-to-point communications. Optical solutions offer the advantage of offering large bandwidth with low attenuation and crosstalk making it suitable for communications, i.e. the exchange of data packets, between servers, see for example Farrington et al in "HELIOS: A Hybrid Electrical/Optical Switch Architecture for Modular Data Centers" (Comput. Commun. Rev., Vol. 40, pp. 339-350); Cho et al in "Power Comparison between High Speed Electrical and Optical Interconnects for Interchip Communications" (J. Lightwave Technol., Vol. 22, pp. 2021-2033); Benner in "Cost-Effective Optics: Enabling the Exascale Roadmap" ($17^{th}$ IEEE Sym. High Performance Interconnects, 2009, pp. 133-137); Miller in "Rationale and Challenges for Optical Interconnects to Electronic Chips" (Proc. IEEE, Vol. 88, pp. 728-749); and Chen et al "Exploring the Design Space of Power-Aware Opto-Electronic Networked Systems" (Proc. Int. Sym. High-Performance Computer Architecture, 2005, pp. 120-131).

Due in part from additional flexibility wavelength division multiplexing as well as datarate across the typical link lengths within a data center interconnection networks based on photonics require that the architectural design, the selection of photonic technologies, and the operating strategies be selected and/or optimized in order to meet the requirements of power consumption, see for example Miller, Cho, Benner, Chen, and Tucker in "Green Optical Communications—Part II: Energy Limitations in Networks" (IEEE J. Sel. Top. Quantum Electron., Vol. 17, pp. 261-274) and "The Role of Optics and Electronics in High-Capacity Routers" (J. Lightwave Technol., Vol. 24, pp. 4655-4673); and scalability, see for example Farrington and Bonetto et al in "The Role of Arrayed Waveguide Gratings in Energy Efficient Optical Switching Architectures" (Optical Fiber Communications 2010, Paper OWY4), that are imposed by the current growth trend in data centers, see for example Pepeljugoski.

In many architectural designs in order to overcome the scalability limitations, multi-plane architectures have been proposed, such as those based upon space-wavelength domain architectures, see for example Gaudino in "Can Simple Optical Switching Fabrics Scale to Terabit per second Switch Capacities?" (J. Opt. Comm. Net., Vol. 1, pp. B56-B69); Raponi et al in "Two-Step Scheduling Framework for Space-Wavelength Modular Optical Interconnection Networks" (IET Commun., Vol. 14, pp. 2155-2165); and Liboiron-Ladouceur et al in "Energy-Efficient Design of a Scalable optical Multiplane Interconnection Architecture," (IEEE J. Sel. Top. Quantum Electron., Vol. 17, pp. 377-383, hereinafter Liboiron1).

Typically, multi-plane architectures are organized based upon cards, each one with multiple ports, and fit well the modular architecture paradigm for data centers, see for example Farrington. The control of the network is delegated to a Two-Step Scheduler (TSS), see for example Raponi. The TSS addresses the problem of scheduling packet transmission by splitting the problem into two steps leading to a reduction of the problem complexity in each step, thereby leading to a reduction in the latency experienced by the incoming packets in large size networks when compared to those controlled by a single-step scheduler. Further, the TSS approach allows for the parallelization of the scheduling operations, leading to faster computation and higher scalability.

It would be beneficial to extend such multi-plane concepts to exploit space and time switching domains for the basic infrastructure with the addition of the wavelength domain to provide additional capacity to increase the throughput whilst maintaining TSS based control. It would be further beneficial for each port of the interconnection network to exploit the same electro-optic interface, leading to a simplification in implementation when compared with architectures that exploit wavelength-dependent ports, see for example Raponi and Liboiron1. Accordingly, the inventors have established space-time domain interconnection network architectures with wavelength domain overlay which overcomes prior art power consumption issues, especially at low levels of utilization, by exploiting an all-optical implementation using self-enabling semiconductor optical amplifiers (SE-SOAs). Such SE-SOAs offer the ability to act simultaneously as a switch and an amplifier, and the possibility to remain in an idle state when unused.

Within many of the architectures and implementations for optical interconnection networks, space switching plays a central role either discretely (single plane architecture) or in conjunction with time and/or wavelength switching (multi-plane architectures) such as described by Liboiron-Ladouceur et al in Liboiron1 and "A Scalable Space-Time Multi-Plane Optical Interconnection Network using Energy-Efficient Enabling Technologies" (J. of Opt. Comm. and Netw., Vol. 6, pp. A1-A11, hereinafter Liboiron2). Space switches allow multiple packets to be routed from any input ports to any output ports along different paths of the interconnection network and can be realized by exploiting optical gating elements as well as optical switching elements. An optical gating element may be controlled to either enable or block the passage of the optical packets. Previously proposed implementations of optical space switches were based on a single type of element, either a switching element such as the microring resonator, see for example Poon et al in "Cascaded Microresonator-Based Matrix Switch for Silicon On-Chip Optical Interconnection" (Proc. IEEE, Vol. 97, pp. 1216-1238) and Bianco et al in "Optical Interconnection Networks based on Microring Resonators" (Int. Conf. Comm. 2010, pp. 1-5), or a gating element such as an SOA, see for example Wonfor et al in "Large Port Count High-Speed Optical Switch Fabric for use within Datacenters" (J. Opt. Comm. and Netw., Vol. 3, pp. A32-A39) and Castoldi et al in "Energy-Efficient Switching in Optical Interconnection Networks" (Int. Conf. Transparent Opt. Netw., 2011, pp. 1-4). However, both microrings and SOAs have drawbacks. Microrings are characterized by small footprint, integrability in CMOS technology, and low power consumption they suffer from differential loss between cross and bar states and intrinsic narrowband operation. In contrast, whilst SOAs are mature, do not suffer path dependent impairments, have fast switching time, are integrable, and their inherent amplification characteristic allows operation as switch and amplifier they suffer from high power consumption.

Accordingly, it would be advantageous to exploit SOAs acting as switch and amplifier in combination with other optical elements in order to provide improved power efficient modulator-gates such that the overall power consumption of proposed heterogeneous space switches according to embodiments of the invention is reduced with respect to a space switch based solely on SOAs.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to addressing limitations within the prior art relating to optical interconnection networks and more particularly to optical interconnection networks exploiting space-time-wavelength domains with reduced power consumption.

In accordance with an embodiment of the invention there is provided a method of transmitting data comprising:
encoding at a transmitter serial electrical data into parallel optical data through the process of:
  receiving an electrical serial data packet for transmission comprising a predetermined number of bits;
  encoding each bit of the electrical serial data packet onto a predetermined wavelength of a plurality of wavelengths;
  delaying each wavelength of the plurality of wavelengths by a first predetermined time delay;
  gating with a first gate the plurality of wavelengths to form a parallel optical data packet, wherein the gated wavelengths are all aligned in time; and
  combining the plurality of gated wavelengths onto a single output port of the transmitter;
transmitting the parallel optical data packet from the transmitter to a receiver via an optical network; and
converting at a receiver the parallel optical data to output serial electrical data through the process of:
  receiving at a single input port of the receiver the plurality of gated wavelengths;
  delaying each gated wavelength of the plurality of gated wavelengths by a second predetermined time delay to generate a delayed gated wavelength, each second predetermined time delay determined in dependence upon the first predetermined time delay; and
  coupling the plurality of delayed gated wavelengths to a broadband photodetector to generate the output serial electrical data.

In accordance with an embodiment of the invention there is provided a method of transmitting data comprising:
providing a transmitter for encoding serial electrical data into parallel optical data;
coupling the output of the transmitter to an input port of an combiner;
coupling the combiner to an input port of an interconnection network;
coupling an output port of the interconnection network a splitter;
coupling a receiver to an output of the splitter; and
decoding the parallel optical data to output serial electrical data with the receiver.

In accordance with an embodiment of the invention there is provided a system for transmitting data comprising:
a transmitter receiving serial electrical data and encoding it into parallel optical data;
coupling the transmitter to an interconnection network; and
a receiver receiving the parallel optical data and decoding it to generate output serial electrical data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to optical interconnection networks and more particularly to optical interconnection networks exploiting space-time-wavelength domains with reduced power consumption.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

1: Single- and Multi-Plane Architectures for Optical Interconnection

Optical communication systems may exploit single-mode and multi-mode based propagation and both have seen widespread deployment to address a wide range of applications from short-haul card-card interconnect through to long-haul and ultra-long-haul networks exploiting time-division multiplexing (TDM) to encode multiple communication sessions to a single channel. Multimode optical fiber networks may exploit limited use of the inherent frequency parallelism available through wavelength division multiplexing (WDM) to overlay several channels onto a single physical fiber these deployments have been typically limited to bidirectional or unidirectional transmission on different wavelength bands, e.g. 850 nm and 1300 nm. However, WDM within single-mode optical fiber links has led to 8, 16, 32, 40, 48, 64, and 80 channel transmission over links of tens to hundreds of kilometers and establishment of wavelength dependent routing (WDR) and reconfigurable optical add-drop modules (ROADM). The interconnection of multiple optical fibers with single channels or multiple WDM channels upon a single optical fiber represent what the inventors refer to as single-plane interconnections, typically referred to as space switching or wavelength switching. Alternatively optical interconnection networks, as the inventors describe below, may exploit the space domain and time domain for switching optical data packets (packets). The inventors refer to such an optical interconnection network as a multi-plane interconnection.

1A: Scalability within Single and Multi-Plane Architectures

Figure 1A:
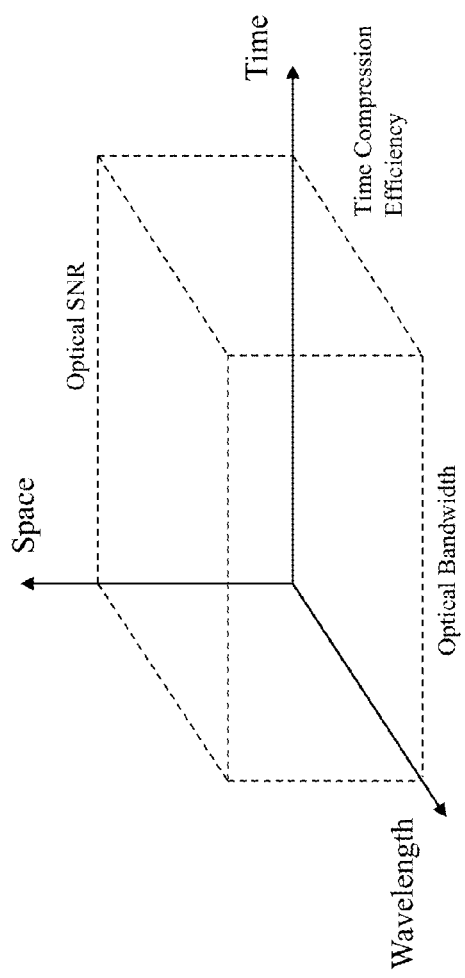
FIG. 1A depicts schematically switching domains and their respective scalability limitations.

Scalability is typically limited by the switching domain as well as by the network performance, e.g. the latency experienced by the packets waiting in the queue. The three possible switching domains are shown in FIG. 1A with their respective scalability limitations. Typically, single-plane optical interconnection networks, i.e. those exploiting a single switching domain, exploit the space domain, such as in broadcast-and-select architectures, see for example Lin et al in "Capacity Scaling in a Multihost Wavelength-Striped SOA-based Switch Fabric" (J. Lightwave Tech., Vol. 25, pp. 655-663) and Hemenway et al in "Optical-Packet-Switched Interconnect for Supercomputer Applications" (J. Opt. Net., Vol. 3, pp. 900-913). As the packet is being broadcast, the power loss can be compensated by the optical amplifiers at the cost of amplified spontaneous emission (ASE) noise, which ultimately limits the scalability from the minimum optical signal-to-noise ratio (OSNR) requirement. For instance, in Liboiron2, the binary tree structure of the broadcast-and-select switch contains amplification stages after a cascade of five power splitters to maintain the optical signal power. The scalability of the single-plane space architecture (S) was in that analysis limited to 1024 ports due to ASE noise accumulation in the SOA-based space-switch. Alternatively, the wavelength domain can also be exploited to realize a single-plane interconnection architecture, see for example Gaudino, wherein the scalability is limited by the wavelength tunability in the transmitters limiting the number of ports to a few tens, e.g. such as for example 40 channels on 0.8 nm channel spacing in the 1550 nm window.

Accordingly, to overcome the scalability limitations imposed by one switching domain, multi-plane architectures can be devised, where multiple switching domains are exploited. In multi-plane architectures, ports in a card are addressed using one domain while cards are addressed using another domain. An example is given by the space-wavelength (SW) architecture; see for example Gaudino, Raponi, and Liboiron2, which exploits the space and wavelength domains to switch packets among cards and ports, respectively. In Liboiron2, the analysis showed that greater throughput is achieved by the multi-plane SW architecture while exhibiting a reduction of up to 40% of the energy per bit compared with a single-plane architecture which solely exploits the space domain. While the space-wavelength makes use of the same space-switch structure, its scalability is enhanced by the wavelength domain and the energy per bit is reduced thanks to the smaller number of active optical components used for the same throughput with respect to the single-plane architecture.

An alternative design of multi-plane architectures with broadcast-and-select switches can be realized by exploiting the third switching domain, i.e., time. However, the time compression efficiency limits the scalability of this domain. Packets can be compressed in time either by increasing the data rate per channel (resorting to speed up or complex modulation formats) or by expanding serial packets in the wavelength domain through wavelength-striped techniques. The inventors have established an approach to time compression without requiring increasing costs and power consumption by exploiting convention time domain multiplexing (TDM) nor require complex modulation formats be implemented to encode and decode the data packets. This is referred to as a Space-Time (ST) Interconnection Network.

1B. Space-Time Interconnection Network Architecture

Figure 1B:
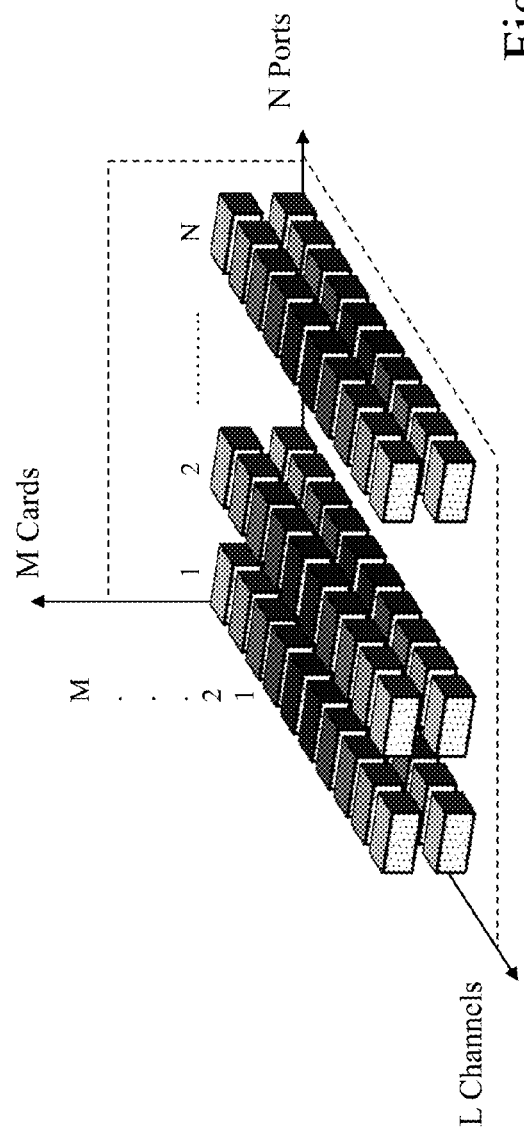
FIG. 1B depicts switching domains exploited in a space-time (ST) architecture.

The space-time (ST) architecture consists of M cards, each supporting N input ports and N output ports. The space-time (ST) architecture exploits the space domain to individually switch packets among cards and the time domain to switch them among different ports, as depicted schematically in FIG. 1B. In addition, the wavelength domain is exploited to further increase the throughput. This is achieved by encoding packets on multiple wavelengths (also referred to as WDM packets) and switching them in space and time among ports of different cards. The WDM packets are switched between input and output ports for example by an M×M semiconductor optical amplifier (SOA) based switch. Optionally, other optical amplification techniques may be employed including, but not limited to photonic integrated circuit optical amplifiers exploiting ion-exchanged glass or silica waveguides, erbium doped fiber amplifiers (EDFAs), rare-earth doped fiber amplifiers, and Raman optical amplifiers. In some instances, such optical amplifiers may require additional elements to provide the required dynamic range of switching on and off for the gated amplifiers.

1B1: Space-Time Interconnection Design:

Accordingly to an Alternate embodiment of the invention a wavelength-striped process is performed electronically where the serial data packet is partitioned (striped) and mapped to multiple wavelengths such that each wavelength carries a portion of the serial packet. A set of optoelectronic components (such as electro-optical (E/O) transmitters or sources and opto-electronic (O/E) receivers or detectors) are assigned to each wavelength, leading to a linear increase of the power dissipation with the number of wavelengths. However, this approach requires that high-speed electronics convert the bit sequence of the serial packet into parallel streams at the transmitter side and compiling the serial packet from the parallel streams at the receiver side would be required.

Figure 2:
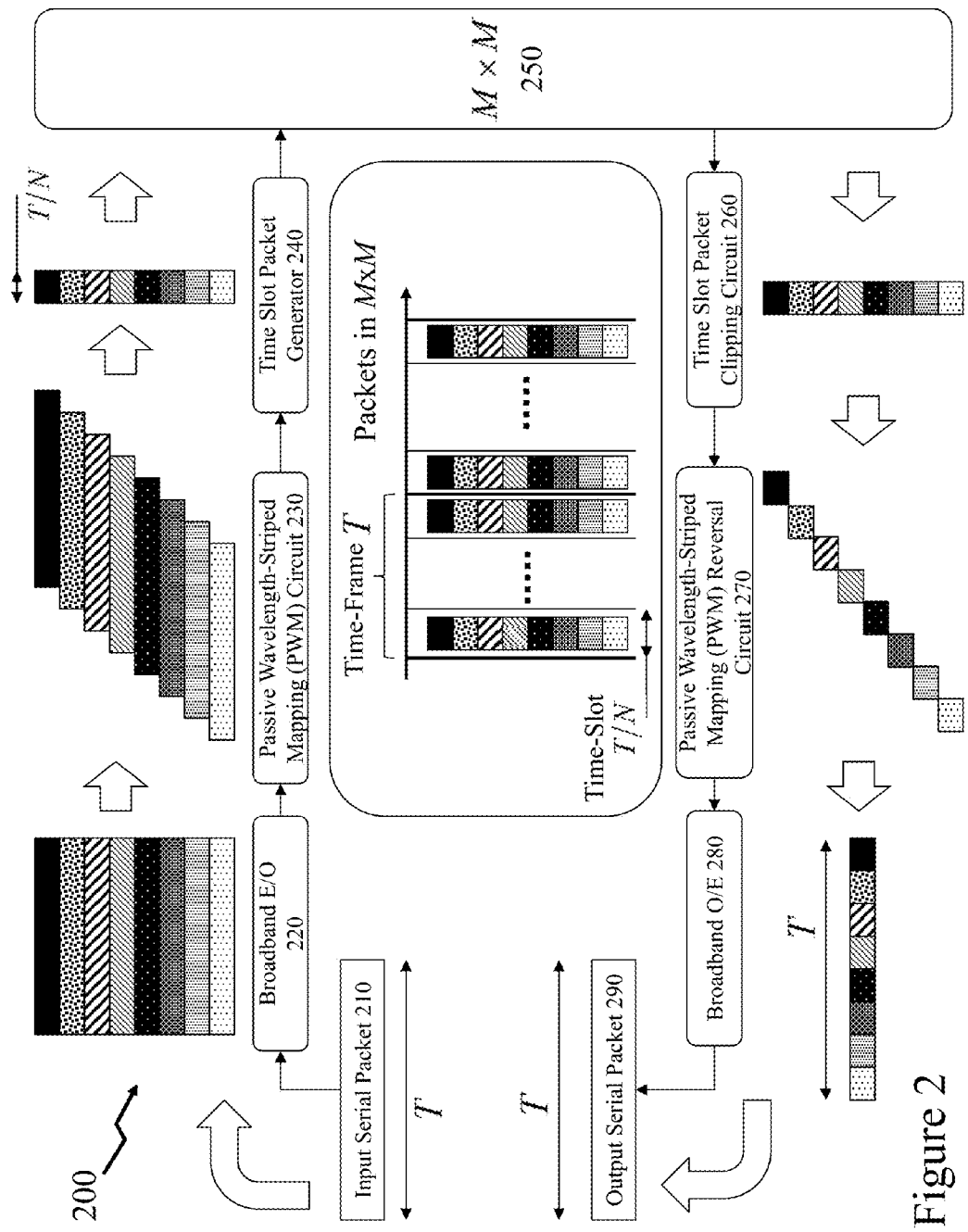
FIG. 2 depicts schematically using time compressed WDM packets on network interface cards through passive wavelength-striped mapping according to an embodiment of the invention.

However, within the embodiments of the invention described below the wavelength-striped process is performed entirely within the optical domain using optical filters and delay lines, see for example Liboiron-Ladouceur et al in "Low-Power, Transparent Optical Network Interface for High Bandwidth Off-Chip Interconnects" (Opt. Express, Vol. 17, pp. 6550-6561, hereinafter Liboiron3). Beneficially, the optical generation of WDM packets is based on a single set of optoelectronic components for the signal conversion between the electrical and optical domains for all wavelengths. The process of creating and receiving a WDM packet is illustrated in FIG. 2 and as described herein with reference to ST Architecture 200. As depicted a serial packet whose transmission duration at the selected data rate is T is employed. Accordingly, the bits of an Input Serial Packet 210 are employed to simultaneously modulate a comb of N optical channels in Broadband E/O 220. For example, Broadband E/O 220 may be realized with a single broadband modulator which modulates an array of N lasers emitting on N different wavelengths. Then, the passive wavelength-striped mapping (PWM) circuit 230 delays the modulated channels in time by (T/N) from each other and the delayed channels are gated in time with Time Slot Packet Generator 240 to generate a WDM packet of duration (T/N). The serial packet is therefore essentially compressed in time by the number of channels N and transmitted as a WDM set. This time slot packet is then coupled to an M×M interconnection fabric 250 before being coupled to PWM Reversal Circuit 270 via the optional Time Slot Packet Clipping Circuit 260 to generate the Output Serial Packet 290. Accordingly PWM Reversal Circuit 270 delays the received WDM packet in time by (T/N) from each other whilst Time Slot Packet Clipping Circuit 260 gates the received WDM packet to select the bits on each packet that constitute the serial packet.

Figure 3:
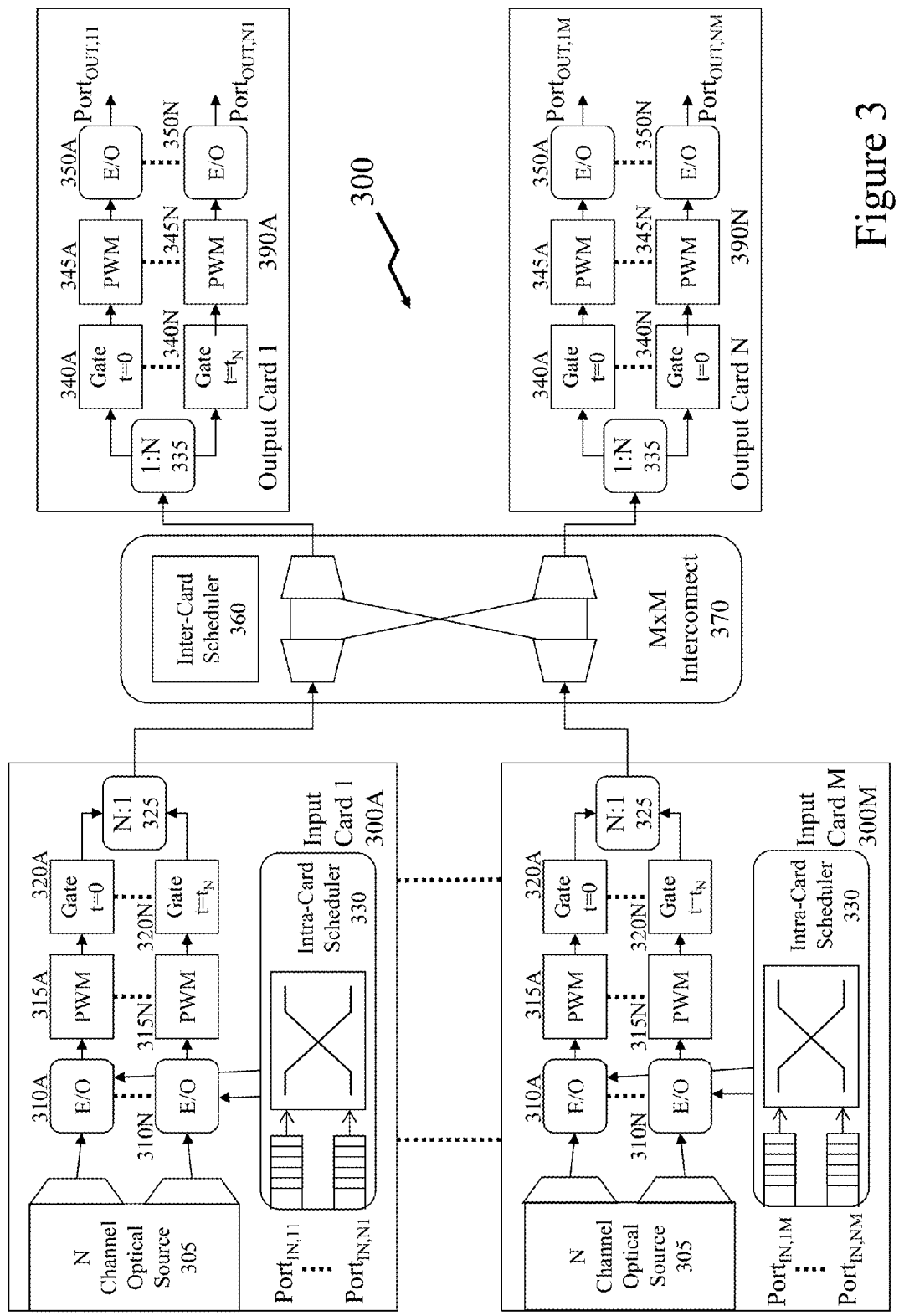
FIG. 3 depicts schematically a space-time interconnection network architecture for M cards and N ports according to an embodiment of the invention.

Accordingly, an implementation of the ST architecture is depicted by ST Architecture 300 in FIG. 3. As depicted a plurality of transmitter side cards, denoted as Input Card A 300A to Input Card M 300M converts data upon a plurality of N input data ports, $Port_{IN,1}$ to $Port_{IN,N}$, to time compressed WDM packets. Each of Input Card A 300A to Input Card M 300M comprises an N-Channel Optical Source 305, for example an array of N lasers or a filtered, fanned-out supercontinuum source, is coupled to an array of external broadband optical modulators (depicted as $1^{st}$ to $N^{th}$ E/O 310A through 310N) wherein data from the Intra-Card Scheduler 330 is encoded onto each wavelength. The output of each $1^{st}$ to $N^{th}$ E/O 310A through 310N is coupled to its corresponding $1^{st}$ to $N^{th}$ PWM 315A through 350N to delay each WDM channel by the appropriate time delay and thence to the corresponding $1^{st}$ to $N^{th}$ Gate 320A through 320N which gate the WDM channels at the appropriate times, $t=t_0, \ldots, t_N$, before being combined with N:1 Combiner 325.

The WDM packets from each of $1^{st}$ Input Card A 300A to $M^{th}$ Input Card M 300M is then coupled to M×M space-switch interconnection 370, controlled by Inter-Card Scheduler 360. At the receiving side, each output port from the M×M space-switch interconnection is coupled to Output Card A 390A to Output Card M 390M wherein the opposite process is performed. Initially the optical signal received is coupled to 1:N Splitter 335 wherein the outputs are coupled to $1^{st}$ to $N^{th}$ Gate 340A through 340N and therein to $1^{st}$ to $N^{th}$ PWM 345A through 345N before being converted back to electrical signals by $1^{st}$ to $N^{th}$ O/E 350A through 350N, each of which is a broadband optical receiver. Where the combiner is a WDM then a single broadband optical receiver is employed but optionally if the combiner is an N×P star coupler then P broadband optical receivers may be employed distributed apart from one another.

Accordingly, it would be evident to one skilled in the art, that the time domain is exploited by sequentially transmitting the WDM packets in different time-slots of duration (T/N). The N time-slots are then combined to form a time-frame of duration T, as shown in FIG. 2. For 100% utilization, up to N compressed WDM packets from different ports can be accommodated in a time-frame. Hence, the number of wavelengths, responsible for the compression factor, corresponds to the number of ports. In this architecture, each time-slot of a time-frame is assigned to a specific port of the output card. In other words, a WDM packet at the k-th input port $Port_{IN,K}$ of the h-th card (k=1, . . . , N and h=1, . . . , M) destined to the n-th output port $Port_{OUT,N}$ of any given output card m (with n=1, . . . , N and m=1, . . . , M) is transmitted in the n-th (n=1, . . . , N) time-slot (see FIG. 2). However, as the time-slot gating is fixed at the transmitting side, a cross-point is now not necessary as described within the prior art, see for example Dally et al in "Principles and Practices of Interconnection Networks" (published by Morgan Kaufmann, 2003). The Intra-Card Scheduler 330 on each card, for example an electrical cross-point switch, connects the input buffer of each port $Port_{IN,K}$ to each modulator input $In_N$ with k, n=1, . . . , N). Hence, the interconnection configuration is performed at each time-frame T based on the Intra-Card Scheduler 360 decisions. The gated WDM packets are then multiplexed together at the card by the N:1 Combiner 325 wherein the WDM packet crosses the M×M space-switch interconnection. At the receiving side, a 1:N Splitter 335 broadcasts the routed packet to the array of PWMs, $1^{st}$ to $N^{th}$ PWM 345A through 345N, of each output port and an SOA gate, for example, selects the time-slot corresponding to the output port.

1B2: Inter-Card and Intra-Card Schedulers:

The presented space-wavelength interconnection network is non-blocking, see Dally, in that at each time-frame it is possible to switch up to M*N packets from every input port to distinct output ports, and the switching configuration can be modified at each time-frame. The switching configurations and packet selection are dynamically decided by the schedulers. At each time-frame, the intra-card and inter-card schedulers select and schedule the packets to be switched, according to the Two-Step Scheduler (TSS) framework described in Raponi. In particular, at each time-frame, the Intra-Card Scheduler 330 running on each of $1^{st}$ Input Card A 300A to $M^{th}$ Input Card M 300M maps the N input buffers to the N time-slots (i.e., to the N output ports). This mapping should ensure that each buffer is assigned to a different time-slot to avoid collisions. For example, the mapping may be performed by solving a weighted matching problem, based solely on buffer information related to the corresponding card. Once solved, the Intra-Card Scheduler 330 is responsible for setting the electrical cross-point switch, depicted as internal to the Intra-Card Schedule 330 but it may be external, at each time-frame.

Based on the decisions of the Intra-Card Schedulers 330, the Intra-Card Scheduler 360 selects the output card for each time-slot on each card. The selection should ensure that each output port on any card is receiving at most one WDM packet. The selection, like that at the input cards, may be performed by solving N weighted matching problems in parallel (i.e., one for each output port) every time-frame. Once solved, the Inter-Card Scheduler 360 controls the M×M space-switch interconnection by setting the N configurations, one for each time-slot.

It would be evident that the scheduling problem for the proposed architecture can be solved also by a unique single-step scheduler. However, in Raponi it was demonstrated that the TSS has a superior scalability in terms of computational complexity with respect to the classical single-step scheduler. Moreover, when practical scheduling algorithms are used with realistic traffic, the sub-optimality of the TSS is counter-balanced by the performance degradation of the single-step scheduler for very high port counts, leading to an overall advantage in using the TSS compared with a single-step scheduler, see Raponi.

1C. Space-Time Architecture Implementation

The implementation of the PWM and the M×M space-switch interconnection is discussed in this section to outline enabling optical technologies suitable as a result of their low propagation loss, optical bandwidth, power efficiency, and integrability. Based on recent developments related to 100 Gigabit Ethernet technology, the line rate has been assumed to be 50 Gb/s and the optical modulation format to be non-return-to-zero on-off keying (NRZ-OOK), see for example Moller in "High-Speed Electronic Circuits for 100 Gb/s Transport Networks" (Proc. Optical Fiber Communication 2010, Paper OThC6).

Figure 4:
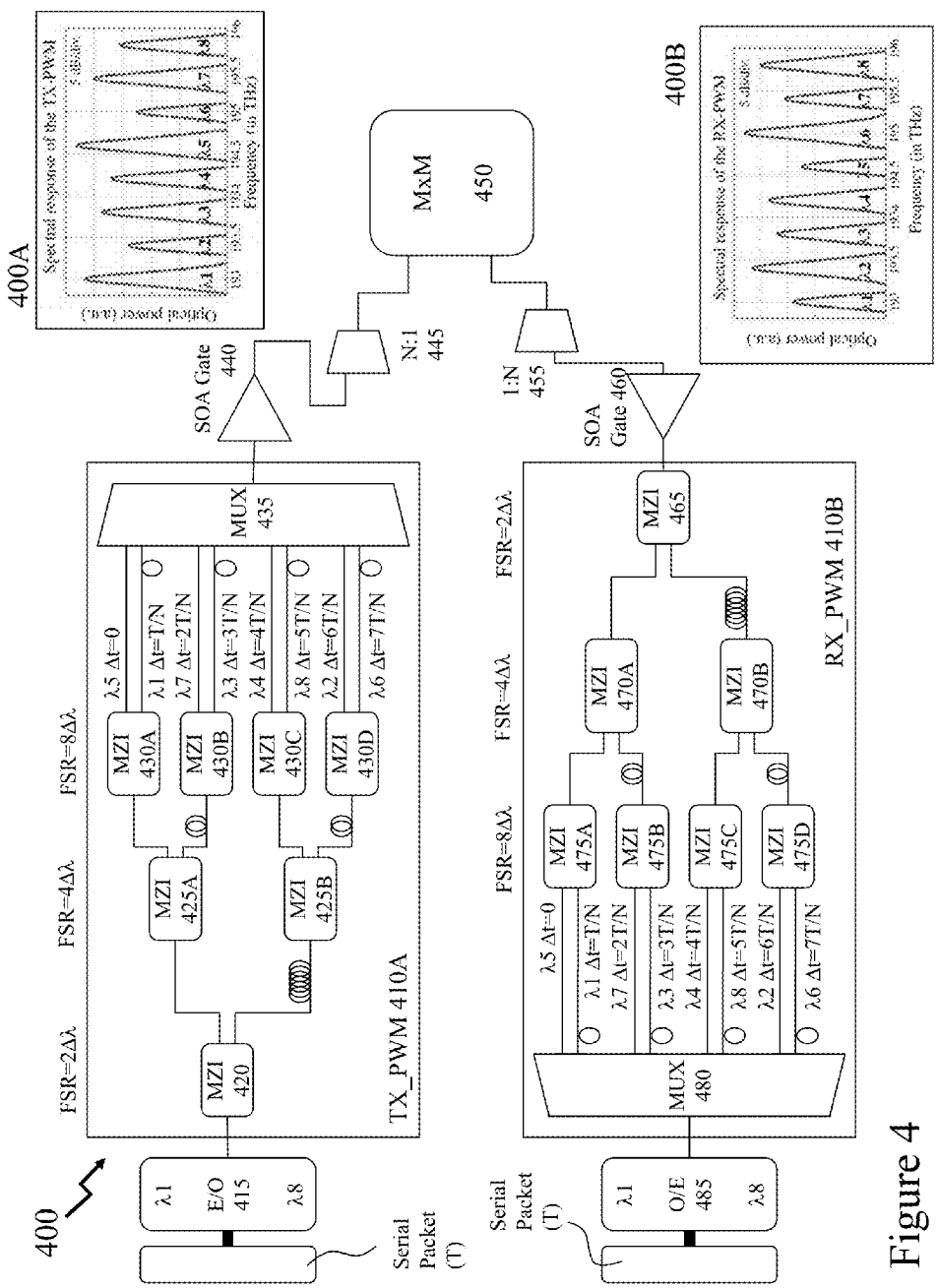
FIG. 4 depicts receive and transmit circuits for performing passive wavelength-striped mapping time-compression of the serial packet at the transmitting card and time-expansion at the receiving card according to an embodiment of the invention.

1C1. Passive Wavelength-Striped Mapping:

An important element in the low power enabling of the Space-Time Architecture is the passive wavelength-striped mapping (PWM) circuit, such as PWM 230 in FIG. 2 and $1^{st}$ to Nth PWM 315A to 315N in FIG. 3, and as depicted in FIG. 4 according to an embodiment of the invention. In the PWM, each wavelength channel should first be filtered and then delayed in time. However, a challenge to address and price to pay in performing the mapping in the optical domain is power loss due to longer propagation within photonic integrated circuits which would provide a small footprint monolithic implementation of the PWM. However, for experimental purposes the inventors have utilized a power-efficient implementation with fiber-based components, see Liboiron3, where the wavelength-striped process was achieved using passive optical components such as filters and fiber delay lines (FDLs). Whilst fiber-based implementation is viable, it becomes increasing impractical and bulky when considering long delays with increasing serial packet length, e.g. delaying 2048 bits at 50 Gb/s requires 8 meters of singlemode optical fiber. Hence, an integrated solution with propagation losses as low as possible becomes important such as silica optical waveguide technologies which allow suitable waveguide delays to be implemented on-chip, see for example LeGrange et al in "Demonstration of an Integrated Buffer for an All-Optical Packet Router" (IEEE Phot. Tech. Lett., Vol. 21, pp. 781-783). In such photonic integrated circuits the total loss of the waveguide delay is strongly dependent on the layout and desired layout efficiency as waveguide bend losses increase with reducing bend radius but typically die footprint reduces with reducing bend radius. Propagation losses for single-mode silica rib waveguides have been reported as low as 3 dB per meter for a 2 mm bend radius, see for example Bauters et al in "Ultra-Low loss Silica-Based Waveguides with Millimeter Bend Radius" (36th European Conf. on Opt. Comm. (ECOC), 2010, Paper We.8.E.6). Filtering may be achieved for example using lattice structure based upon Mach-Zehnder interferometers (MZIs) or filters inserted into slots within the waveguides to filter each wavelength. The lattice structure has one input and consists of a binary tree of MZI stages for filtering the WDM channels such that for example P stages provide $2^P$ wavelengths using $(2^P-1)$ MZIs provided that the free spectral ranges (FSR) of the stages are appropriately set. Hence, if the first stage is set to separate the even from the odd labeled channels ($\lambda 2, \lambda 4, \lambda 6, \lambda 8$ from $\lambda 1, \lambda 3, \lambda 5, \lambda 7$) then the second stage may be set to separate alternate channels, e.g. $\lambda 2, \lambda 6$ from $\lambda 4, \lambda 8$, and then the final stage separates to individual channels. With a channel separation of 400 GHz (approximately 3.2 nm at 1500 nm) the first stage MZI, MZI 420, is designed with an FSR of 800 GHz, the second stage MZIs, 425A and 425B, are designed with an FSR that is four times the channel separation, e.g. GHz, and then the third stage MZIs, 430A through 430D, are designed with an FSR of 3200 GHz to individually filter each channel. Between the MZI stages, appropriate delays are inserted to perform the wavelength-striped mapping as shown in FIG. 4.

It would be evident that generally other optical technologies, such as those exploiting microrings and array waveguide gratings (AWGs), would not be suitable in this design configuration due to their high loss. For microring resonators, large FSRs are achieved with small radius leading to higher loss in the resonance cavity whilst the AWG approach incurs overall greater loss due to the delay requirements within the phased array region of the circuit. Accordingly, the inventors have exploited in experiments and simulations the MZI approach but different optical designs may exploit these other techniques, especially if design improvements for microrings or AWGs for example result in reduced loss compared to the MZI approach.

Typically silica based MZI uses multimode interference (MMI) 3 dB couplers for minimal loss and required arm imbalance for the target FSR. A typical estimated insertion loss per MZI is 1 dB based on recent developments presented by Jinguji et al in "Synthesis of One-Input M-Output Optical FIR Lattice Circuits" (J. Light. Tech., Vol. 26, pp. 853-866). Time delays corresponding to a multiple of the time-slot are appropriately integrated within the lattice structure. Accordingly, the WDM array of optical signals from the E/O 415 are demultiplexed and time delayed within the TX_PWM 410A before being combined using a silica-based AWG with an estimated insertion loss of 5 dB, see for example Kakehashi et al in "Analysis and Development of Fixed and Variable Waveband MUX/DEMUX utilizing AWG Routing Functions" (J. Light. Tech., Vol. 27, pp. 30-40) and Ito et al in "Small Bend Structures using Trenches filled with Low-Refractive Index Material for Miniaturizing Silica Planar Lightwave Circuits" (J. Light. Tech., Vol. 27, pp. 786-790). A semiconductor optical amplifier (SOA) 440 is used to generate the WDM packet by gating in time the optical signal as shown in FIG. 2. The gating is performed on the optical signal at the output of the AWG 435 by the SOA 440, which is electrically pumped with a pulse of width T/N. The timing of the gating pulse with the incoming WDM packet is controlled by the Intra-Card Scheduler, not shown for clarity, within the Input Card, e.g. one of $1^{st}$ Input Card A 300A to $M^{th}$ Input Card M 300M. The gating SOA 440 also plays the important role of optical amplifier to compensate for the optical power loss in the PWM.

The implementation approach of the PWM has a strong effect on its scalability in terms of port number as certain wavelength channels experience greater insertion loss. For example, with a packet sub-slot of 16 ns (T/N) with a total serial packet length of 128 ns (800 Bytes at 50 Gb/s) and N=8, the maximum insertion loss difference in the PWM is 10.5 dB between two channels, see first insert 400A in FIG. 4. Each 16 ns delay induces approximately 1.5 dB of loss. To ensure physical layer scalability of the SOA-based interconnect, the laser sources may be pre-compensated to obtain equal power for each channel of the WDM packet being launched in the M×M interconnection 450. At the destination card, the loss difference between channels is reversed, e.g., channel λ6 will experience the lowest in the PWM at the receiving side, RX-PWM 410B, since it experienced the most loss in the PWM at the transmitting side, TX-PWM 410A. In the RX-PWM 410B, the maximum loss difference remains 10.5 dB between the channels as evident from second insert 400B, which can be compensated or converted using an optical receiver with large dynamic range. In this proposed configuration, the PWM can be implemented without an amplification stage and is estimated to have a footprint of approximately 21 $cm^2$. For a greater number of ports the total insertion loss, using the figures and designs described supra, needs to be compensated with the inclusion of one or more optical amplifiers within the PWM, which may for example be SOAs flip-chipped onto the planar integrated circuit, see for example Maxwell et al in "Hybrid Integration of Monolithic Semiconductor Optical Amplifier Arrays using Passive Assembly" (Proc. 55th Elec. Components and Tech. Conf., 2005, pp. 1349-1352), or formed using erbium (Er) doped silica waveguides, such as Lee et al in "Optical Gain at 1.5 μm in Nanocrystal Si-Sensitized Er-Doped Silica Waveguide Using Top-Pumping 470 nm LEDs" (J. Light. Tech., Vol. 23, pp. 19-25). In the instance of Er-silica waveguides the required gating may be provided by switching the pump lasers on and off and/or adding gate elements to the outputs of the Er-silica waveguide.

Figure 5:
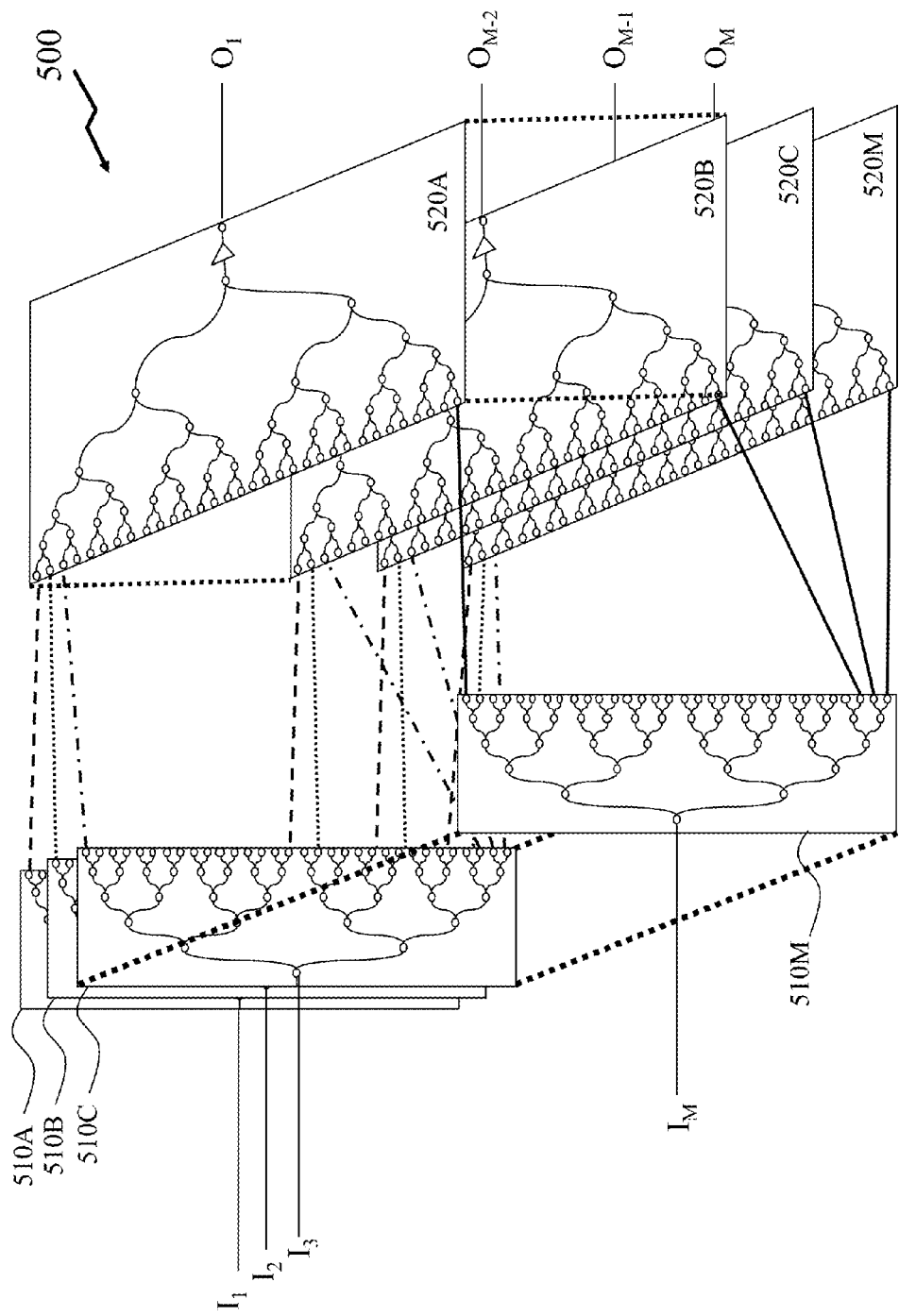
FIG. 5 depicts an M×M space-switch interconnection comprised of 1×M space-switches and M:1 combiners according to an embodiment of the invention.

1C2. Energy-Efficient M×M Space-Switch Interconnection:

As depicted in FIG. 3, the considered architecture for the M×M space-switch interconnection 370 consists of a broadcast-and-select implementation with M 1:M space-switches controlled by the Inter-Card Scheduler 360 and M M:1 couplers. Each 1:M space-switch 510A through 510M is a binary tree structure of 3 dB couplers with SOAs, while each M:1 coupler 520A through 520M is another binary tree structure of 3 dB couplers with SOAs, as shown in FIG. 5. FIG. 5 also indicates a possible implementation that is achieved by connecting the 1:M space-switches 510A through 510M placed on M vertical input layers to the M:1 couplers 520A through 520M placed on M horizontal output layers. The passive optical interconnection can still be cumbersome as a number of connections equal to $M^2$ is required for a space-wavelength network with an overall number of input ports MN. However, such a number of connections is $N^2$ times smaller than the number of connections required by a single-stage interconnection network based only on such a space-switch with the same number of ports, i.e., MN.

The SOAs on the terminal branches of the 1:M space-switches 510A through 510M, not shown for clarity, act both as amplifiers and as switches that may enable or block the passage of the optical signal, as decided by the appropriate inter-card scheduler. The SOAs on the output of the M:1 couplers 520A through 520M are required for amplification purposes only. Moreover, typically additional stages of SOAs are required every five splitting stages (in both the 1:M space-switch and the M:1 coupler) to compensate for the power loss introduced by the 3 dB splitters, i.e. the 15 dB splitting or combining loss. Alternatively, where M is large multiple groups of such SOAs every 5 stages may be replaced with a single optical amplifier, e.g. EDFA, with higher gain, e.g. 30 dB, which is gated by addition of a programmable attenuator or switch and/or switching on and off of the pump laser depending upon the required rise/fall times of the gate. Accordingly, a single 30 dB gain stage may replace 32×32 15 dB SOAs=1024 SOAs.

In FIG. 3, each Inter-Card Scheduler decides that the k-th input port $I_K$ should be connected to the n-th output port $O_N$ during a given time-slot. For an energy-efficient implementation therefore only the SOAs in the path from the input port $I_K$ to the output port $O_N$ should be enabled, whilst the unused SOAs are in an idle, dissipating minimum power, commensurate with the reconfiguration time for transmitting the next data block and enabling/disabling different sets of SOAs. Accordingly, the state of SOAs in the 1:M space-switches 510A through 510M is controlled by the appropriate Inter-Card Scheduler. In contrast, the M:1 couplers 520A through 520M are not controlled by the Inter-Card Scheduler unless alternate signalling is provided such that power minimization is ideally accomplished as the result of a self-enabling mechanism.

Figure 6:
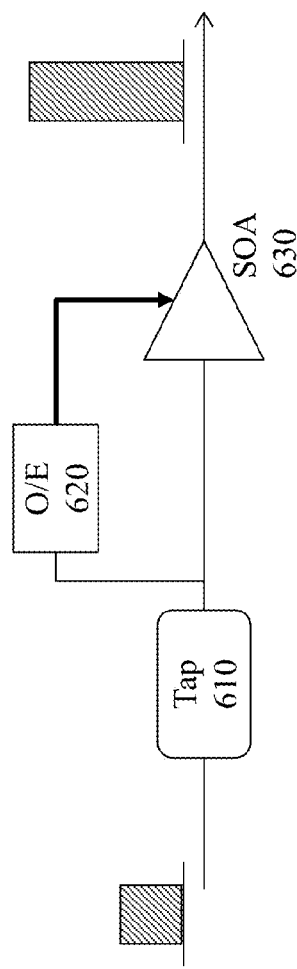
FIG. 6 depicts an energy-efficient self-enabled SOA (SE-SOA) for use within 1×M space switches according to an embodiment of the invention.

The working principle of the self-enabled SOA is depicted in FIG. 6 wherein a small amount of the optical power, e.g. 10%, of the incoming optical packets is converted to an electrical signal via Tap 610 and O/E 620 with a pulse width equal to the propagating packet length. The converted electrical signal is then the input of a current driver injecting carriers (i.e. the current injection pump) in the SOA active region to provide the necessary gain to the input packet. Accordingly such an SE-SOA may be employed as a switch such that only those M:1 couplers 520A through 520M with received optical signals amplify and then for only the duration of the received data packet. Such SE-SOAs have been demonstrated to switch in the sub-nanosecond range, see for example Gallep et al in "Reduction of Semiconductor Optical Amplifier Switching Times by Pre-Impulse Step-Injected Current Technique" (IEEE Phot. Tech. Lett., Vol. 14, pp. 902-904) and Liboiron-Ladouceur et al in "Optimization of a Switching Node for Optical Multistage Interconnection Networks" (IEEE Phot. Tech. Lett., Vol. 19, pp. 1658-1660, hereinafter Liboiron4) and "The Data Vortex Optical Packet Switched Interconnection Network" (J. Light. Tech., Vol. 26, pp. 1777-1789, hereinafter Liboiron5, and can be used to switch packets in broadcast-and-select space-switches, see for example Liboiron3, Lin, and Hemeney.

Despite the high switching speed capability of SOAs, a guard time (guardband) must be introduced for each time-slot wherein the duration of this guard time depends on the rising time of the enabled SOA. Faster switching time can be achieved with a higher bias current used in the idle state as long as it is below the SOA transparency condition, see for example C. Tai and W. Way, "Dynamic Range and Switching Speed Limitations of an N×N Optical Packet Switch based on Low-Gain Semiconductor Optical Amplifiers" (J. Light. Tech., Vol. 14, pp. 525-533) and Burmeister et al in "Integrated Gate Matrix Switch for Optical Packet Buffering" (IEEE Phot. Tech. Lett., Vol. 18, pp. 103-105). However, such a bias current also negatively affects the extinction ratio, see for example Ehrhardt et al in "Semiconductor Laser Amplifier as Optical Switching Gate" (J. Light. Tech., Vol. 11, pp. 1287-1295), and hence there is a tradeoff between the switching speed, the extinction ratio, and the power dissipation of the SOA when idle. Optionally, instead of adding guardbands the inventors have established that an electrical pulse stretcher may be employed to extend the pulse such that the payload does not get alleviating the need for the guard time.

1D. Performance Analysis

The performance of the ST architecture was evaluated and compared with the space-wavelength (SW) architecture presented by Liboiron-Ladouceur et al, see Liboiron3, and a single-plane space architecture (S) as discussed supra in respect of Section A. The metrics of interest in the assessment were the physical layer scalability, the network performance, and the power consumption.

1D1. Scalability:

The scalability in size of the ST architecture is determined by the limitation of the switching domains, as shown in FIG. 1A wherein the maximum number of cards that the network can support is constrained by the optical signal-to-noise ratio (OSNR) degradation experienced by the WDM packets when traversing the M×M space-switch interconnection. The physical layer analysis was performed using commercial optical system software (OptiSystem). The SOA simulated was based upon the work of Tanaka, see Tanaka et al in "Monolithically Integrated 8:1 SOA Gate Switch with Large Extinction Ratio and Wide input Power Dynamic Range" (J. Quant. Elect., Vol. 45, pp. 1155-1162), with a noise figure of 8.6 dB and a saturated output power of 15.6 dBm.

The physical layer analysis accounts for both saturation power and ASE noise accumulation from the SOA devices in the data path of the WDM packet. At a modulation rate of 50 Gb/s and 8 ports per card, the bit-error rate is lower than $10^{-9}$ for M up to 8192 cards for a total of 216 ports. The scalability to 8192 cards of the ST architecture is four times higher than the scalability of the SW architecture and eight times higher than the scalability of the S architecture, see Liboiron3. The maximum number of ports per card (N) that the network can support is constrained by the wavelength-striped technique used for packet time-compression. Since the time-compression is based on WDM, N is limited by the maximum number of wavelengths that can be used in the C band with an adequate physical layer performance. While a large port count is possible, as for example 40 plus channels are common on long-haul networks using the C-band at 100 GHz (0.8 nm) spacing, eight ports was chosen in the proposed architecture as no amplification would be required within the PWM stage of the interconnection network.

Greater throughput can be achieved through the use of complex modulation formats. For example by encoding more bits per symbol as in 100 Gb/s differential quadrature phase shift keying (DPQSK), the maximum throughput can be increased (by a factor of 2 in the case of DPQSK) without any changes to the network architecture as the interconnection is transparent to the data rate and modulation format. By using more complex modulation formats, the energy consumption increases due to the more complex optical modulators (e.g., nested modulators) but in a predictable linear manner with the overall number of ports.

1D2. Network Performance:

The network performance of the ST architecture is driven by the performance of the intra-card and inter-card scheduler algorithms and affects both the throughput of the network and the queuing delay experienced by the packets in the input buffers. The schedulers avoid packet collisions and are able to ensure the delivery of all the packets to the output ports, leading to 100% throughput, see for example Raponi. Therefore the level of load also corresponds to the effective network utilization as packets are transmitted between interconnected cards. The maximum throughput of the ST network is (MN/T) packets per second. However, such a theoretical value is difficult to achieve due to the necessity of introducing a guard time for each time-slot. Assuming a guard-time duration of (kT/N) seconds, where k is a ratio normalized to the WDM packet duration, the time-slot and the time-frame durations increase to T/N(1+k) and T(1+k), respectively, and the maximum throughput would drop to MN/[T1+k)] with a relative performance loss of k/(1+k).

The queuing delay is evaluated here to assess whether the limited scalability of the number of ports per card (i.e., N≤8) imposed by the physical layer is detrimental. Two configurations of the interconnection network are considered. Both configurations have the same maximum throughput, i.e., the same number of total input ports (MN=4096 and MN=8192). The simulations are performed using the maximal matching algorithm iSLIP, see for example McKeown in "The iSLIP Scheduling Algorithm for Input-Queued Switches" (IEEE/ACM Trans. Netw., Vol. 7, pp. 188-201), in the second step of the TSS, see Liboiron3. The packets are generated according to an ON/OFF Markov modulated model, with a mean ON duration equal to 32 packets and with uniform distribution on the destinations (i.e., output ports and cards).

Figure 7:
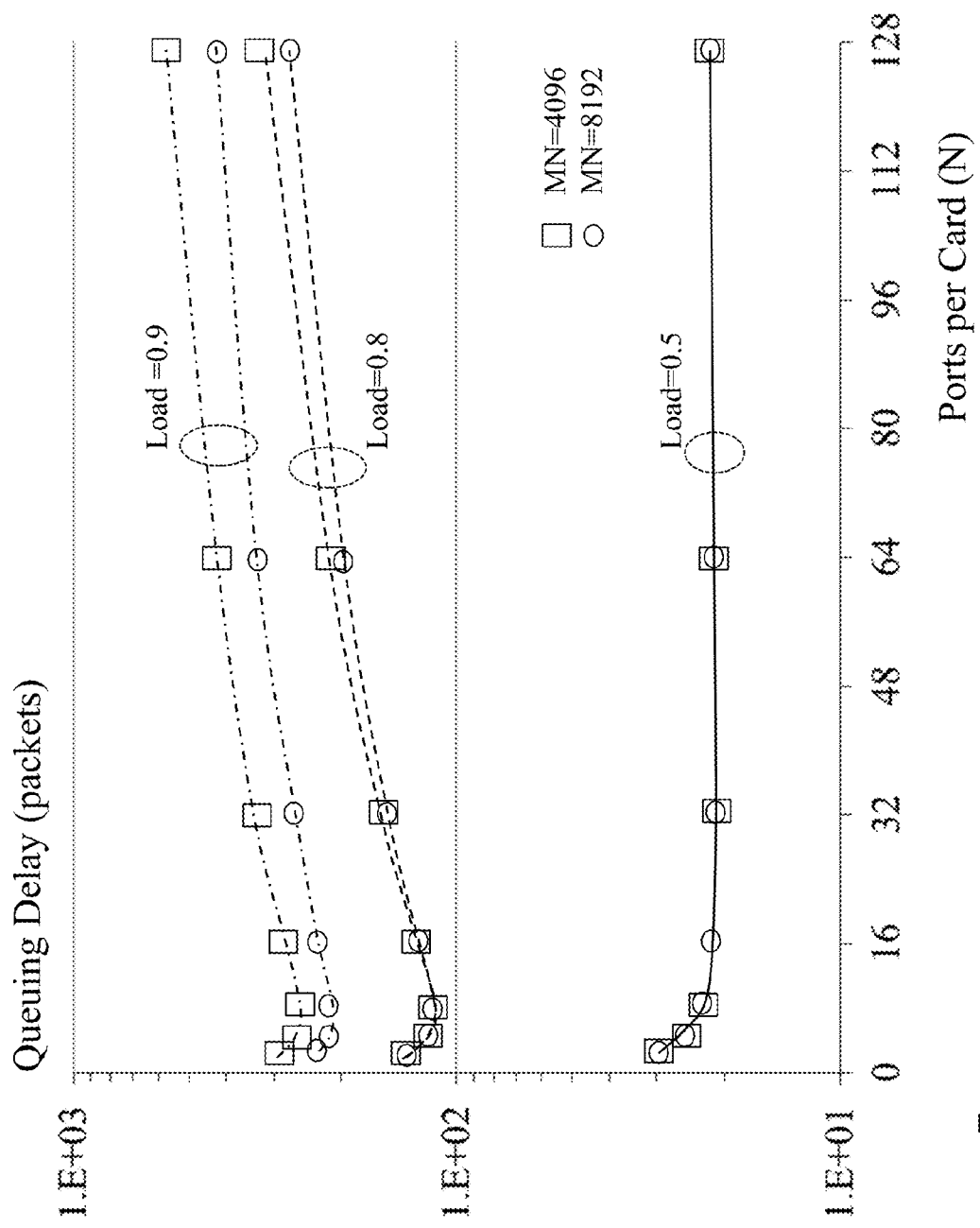
FIG. 7 depicts queuing delay versus number of ports for an optical interconnection network according to an embodiment of the invention.

FIG. 7 shows how the queuing delay is affected by the varying number of ports per card, N, without considering the scalability limitation imposed by the physical layer. Independently of the considered loads, the queuing delay improves when increasing N from 2 ports up to reach a minimum whose value is load dependent. Such behavior can be explained as follows: when N is low (i.e., with a small number of time-slots), it is more probable that all the packets stored in different input buffers of a card are destined for the same output port, i.e., must be transmitted in the same time-slot. Thus, multiple time-frames are necessary to accommodate them, leading to an increased delay. Increasing the number of ports mitigates this problem since the probability of finding a maximal matching (and thus sending one packet for each time-slot) improves. When the number of ports per card is further increased, the behavior of the queuing delay depends on the load. For medium loads (e.g., 0.5 in the figure), the queuing delay is almost constant. As the load increases (e.g., 0.8 and 0.9), the delay performance degrades with N. At high loads the comparison of the delay performance for the configurations with MN=4096 and MN=8192 ports shows that the delay difference is minimal and mainly experienced for high values of N. Such differences and the degradation in performance for large N depend on iSLIP behavior at high loads. In fact, in these conditions, iSLIP is known to have poor performance for small size matching problems, see McKeown. In FIG. 7, the problem size (in number of cards M) decreases when passing from MN=8192 to MN=4096 for a fixed N and when moving along the x-axis (i.e., increasing N with fixed MN).

In summary, the delay performance indicates that a low value of N (ranging from 4 to 16) is preferable as it ensures a minimal delay for high loads (with N=8 being the optimal value) and a limited delay at medium-low loads. The scalability limitation of up to N=8 ports per card imposed by physical layer performance is in fact leading to better delay performance at high loads and good performance at medium and low loads.

1D3. Energy Consumption:

The energy consumption of the M×M space-switch interconnection and the overall ST architecture is evaluated keeping in consideration the power consumptions of the optical devices in active and idle modes. The devices contributing to the power drainage are laser arrays (8×200 mW; see Zhu et al in "The Fabrication of Eight-Channel DFB Laser Array using Sampled Gratings" (Phot. Tech. Lett., Vol. 22, pp. 353-355), modulators and drivers (225 mW), SOAs (5 mW when idle, 455 mW when enabled, see for example Tanaka and Sahri et al in "A Highly Integrated 32-SOA Gates Optoelectronic Module Suitable for IP Multi-Terabit Optical Packet Routers" (Optical Fiber Communications, 2001, Vol. 4, Paper PD32), and receivers (250 mW). The overall power consumption per bit/s (energy per bit) of the ST architecture is compared with the power consumption of the SW and S architectures, as a function of the network utilization.

When the network utilization increases, a large number of packets are switched and therefore a large number of optical devices are active and drain power. In particular, it is assumed that the SOAs in the M×M space-switch are enabled when WDM packets need to be switched, or idle otherwise. Therefore, the average power consumption of the SOA is linearly increasing with the average network utilization. Also, it is assumed that the receivers, the modulators, and the drivers drain more power when modulating. More specifically, the power consumption of the modulator increases from 225 mW to 300 mW when utilized. The increase in power consumption of the receiver is negligible (approximately 1 mW). Finally, the laser arrays are assumed to be always on, independent of the level of network utilization. As a result, the average power drained by SOAs is more utilization dependent than the other devices.

Figure 8:
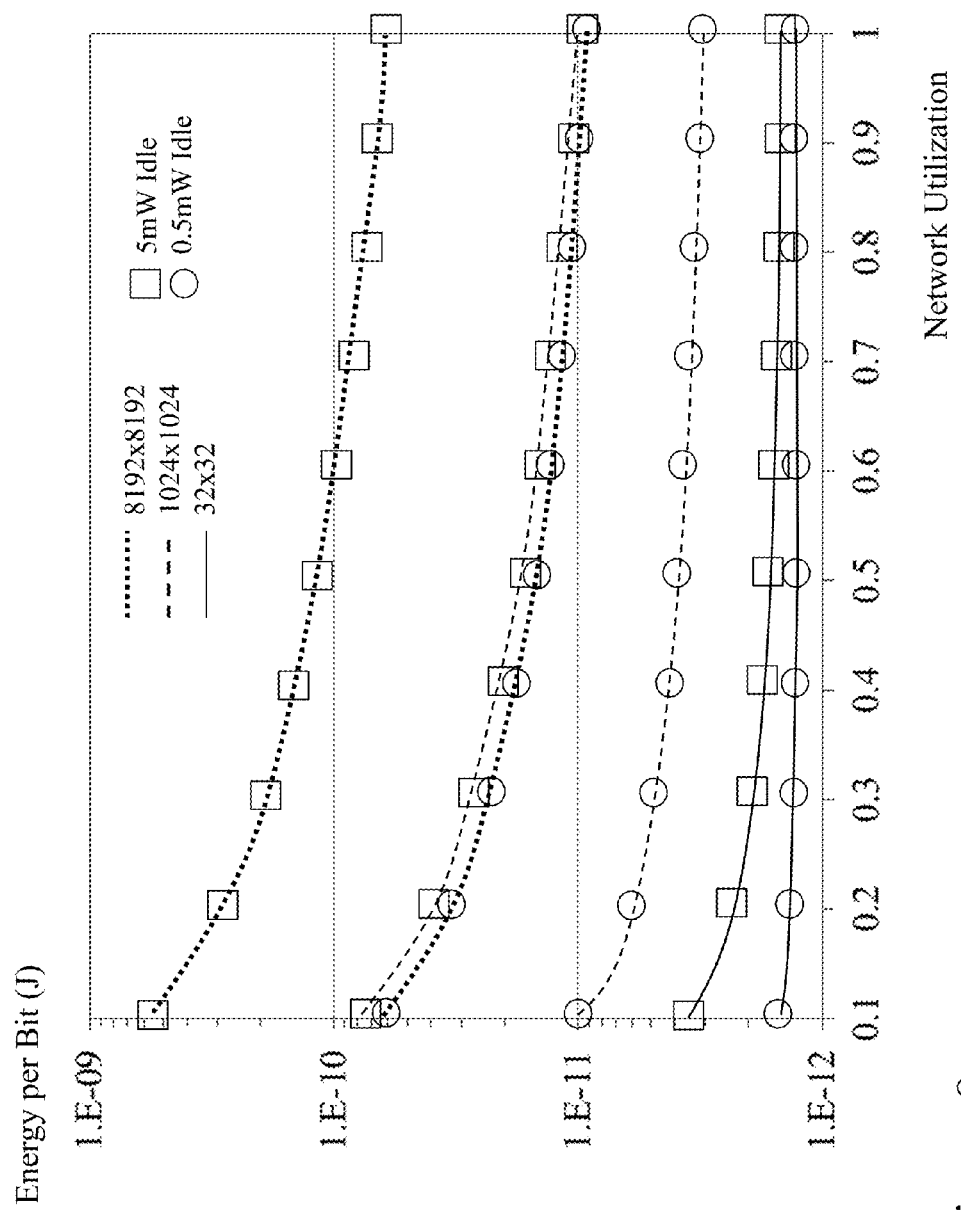
FIG. 8 depicts energy per bit for the SOA-based M×M space-switch interconnection for different idle mode power dissipations.

The energy per bit of the SOA-based M×M space-switch interconnection is shown in FIG. 8 for varying numbers of interconnected cards M. The results for M=32 cards (solid lines in the figure) show an energy per bit of a few picojoules and are similar to previous works on SOA-based space-switches, see for example Albores-Mejia et al in "Monolithic Multistage Optoelectronic Switch Circuit Routing 160 Gb/s Line-Rate Data" (J. Light. Tech., Vol. 28, pp. 2984-2992). As the network utilization increases, the energy per bit is almost constant or decreasing. A utilization independent energy per bit means that the energy efficiency is optimal and that the number of active SOAs increases linearly with the network utilization. In the considered M×M space-switch interconnection with broadcast-and-select architecture, the SOA used for amplification at the output stage must always be active. This is why their energy per bit improves with the network utilization. In addition, the amount of power associated with the SOAs in idle mode decreases with the network utilization, leading to an improvement of the energy efficiency at a high level of utilization. FIG. 8 also shows that the energy consumption is affected by the switch size M, since the number of SOA devices increases as the interconnection scales. The increase in the total number of SOAs with $M^2$ explains the increase of energy per bit for larger space-switch sizes. The number of active SOAs scales linearly with M; therefore the increase in power consumption is mainly due to the idle SOAs. In fact, there is a significant drop of the energy per bit when the idle power of the SOAs (due to the drained bias current) is reduced to 10% (from 5 mW to 0.5 mW). For large space-switch sizes, the drop in energy consumption is almost one order of magnitude. SOA devices with their idle mode consuming close to zero power (0.5 mW, dashed lines in the figure) would enable low energy per bit of the order of picojoules per bit for interconnection network sizes up to 1024 cards. Technological progress and innovations suggest that no current could be used in the idle mode and a switching time in the range of nanoseconds would still be possible, see for example Albores-Mejia.

The energy per bit of the SW interconnection network is quantified by adding the energy consumption of the M×M space-switch interconnection to the energy consumption of the laser arrays, the receivers, the modulators, and the drivers. The energy per bit is evaluated as a function of the network utilization in FIG. 9 for different sizes M×N of the network architecture and it is compared with S and ST architectures.

Figure 9:
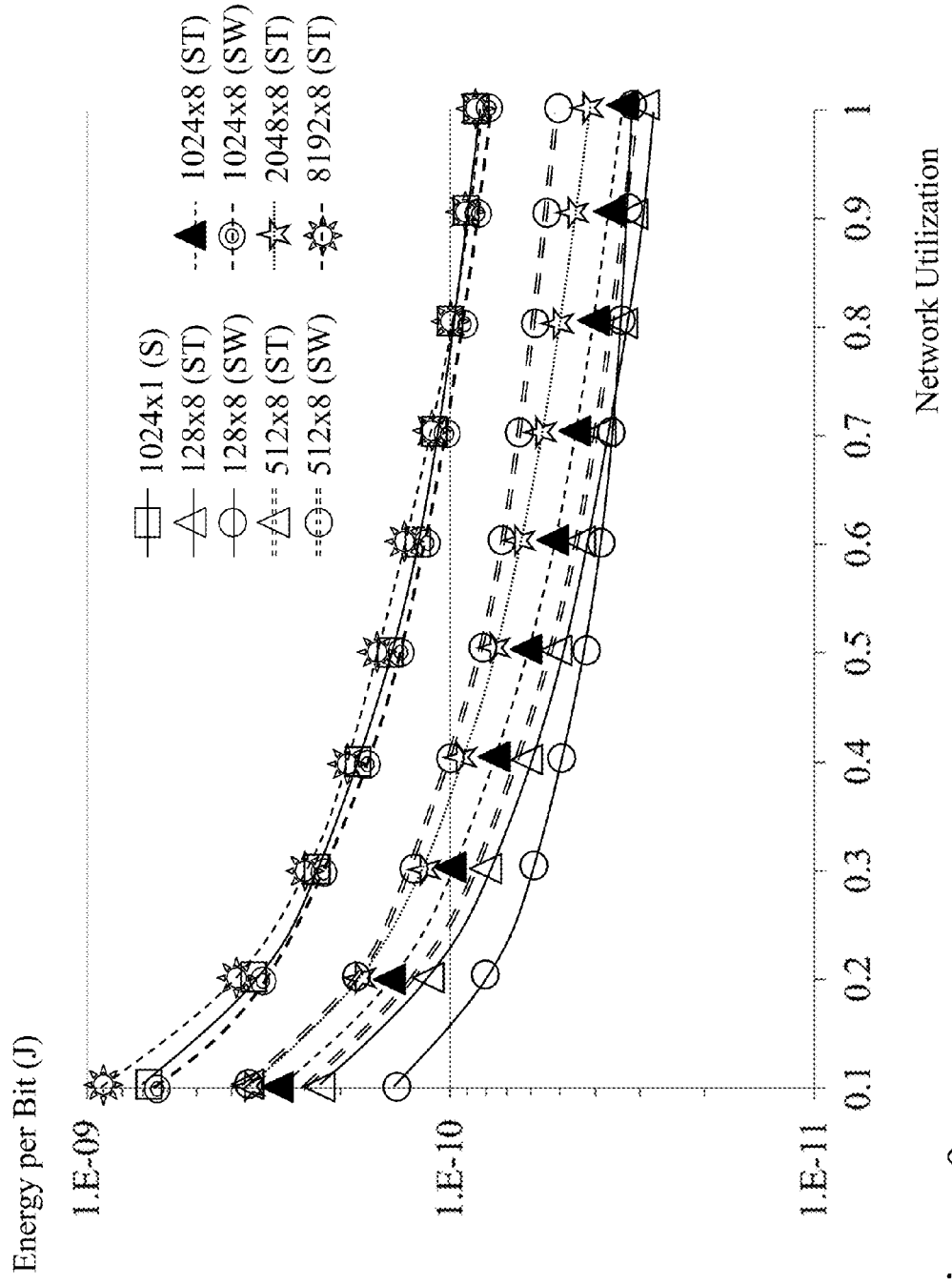
FIG. 9 depicts energy per bit for a space-time (ST) architecture compared with a space-wavelength (SW) and single-plane (S) architectures for various network sizes M×N and varying SOA idle mode power dissipations.

As discussed supra in section 1D1 Scalability, the ST architecture scales up to 8192×8. In contrast, the S and SW architectures scale up to 1024×8 and 512×8, respectively, as derived in Liboiron3, primarily limited by the physical layer. For all three architectures, the energy consumption decreases at high network utilization. This reduction is only in part due to the behavior of the energy consumption of the M×M space-switch interconnection, see FIG. 8. The main reason for the reduction is due to the energy consumption of the laser arrays that is constant independently of the network utilization, making the network more power-efficient at high utilization levels. The use of self-enabling technology and SOAs with low power idle mode allows compensation for the power dissipation of the laser arrays. FIG. 9 shows also that the single-plane architecture (S) consumes more energy per bit than the multi-plane architectures (ST and SW). When comparing the three architectures with the same overall number of ports (i.e., 1024), the 1024×1 single-plane architecture (S) consumes more energy per bit than the 128×8 multi-plane architectures (ST and SW). The energy effectiveness of the multi-plane architectures also holds when increasing their port count. In other words, for the same energy per bit (corresponding to the energy per bit of the 1024×1 S) the SW architecture can be designed with an 8-times higher port count and the ST architecture can be designed with a 64-times higher port count.

Among the multi-plane architectures, the SW architecture is more energy efficient than ST only when the number of cards is low (i.e., M≤128). Interestingly, the energy consumption of the ST architecture increases more slowly with the network size and thus is more energy efficient than SW when M increases further. The reason for the better scalability is mainly due to the different sizes and complexities of the space-switches: the ST architecture requires a M×M space-switch that can be realized with M 1:M switches and M M:1 couplers, whereas the SW architecture requires NM×M space-switches (and couplers) per card, leading to MN switches (and couplers). Thus, the number of switches and couplers in ST architecture is reduced by a factor of N with respect to the SW architecture. This makes the ST architecture not only more scalable in size but also in energy consumption.

2. Heterogeneous Switch Architectures

Within the preceding section comparisons of single and multi-plane switching architectures for large scale interconnection were made with respect to considerations of scalability and power consumption. As presented in FIGS. 3 and 4 a plurality of input and output cards exploiting WDM parallelism for transmission are interconnected via an M×M Interconnect exploiting SOA gating elements. It was also evident that the overall power consumption of the overall switch fabric depends heavily upon the active and idle power consumption of the amplifier (SOA) gating elements. Accordingly, within this section variants of amplifier gated switching architectures are presented exploiting modulator-based gating elements in conjunction with amplifier-based gates (typically SOAs) in the same space switch architecture, thereby taking advantage of both technologies. The modulator-based gating element may for example be an optical switch based on the electroabsorption effect or a Mach-Zehnder interferometer (MZI).

The inventors refer to such novel switching architectures and fabrics as heterogenous space switches, as opposed to homogenous space switches discussed supra exploiting only amplifier gating. As will be shown alternating amplifier (SOA) stages with stages of the more power-efficient modulator-based gates, the overall power consumption of heterogeneous space switches according to embodiments of the invention are reduced with respect to a homogeneous space switch. At the same time, the optical power loss caused by electroabsorption or interferometric devices can be compensated by the amplification capabilities of SOAs. Novel hybrid integration technologies, see for example Roelkens et al in "III-V/Silicon Photonics for On-chip and Intra-Chip Optical Interconnects" (Laser & Photonics Rev., Vol. 4, pp. 751-779), may be exploited to realize such heterogeneous switches.

Within this section the requirements of the number of gating elements, both amplifier and modulator-based elements, for different non-blocking space switch architectures including crossbar, Benes, Spanke-Benes, Clos, and hybrid Clos, and their scalability for a large number of ports are assessed as opposed to the fully-connected architecture, or Spanke architecture, exploiting 1×M splitters and M×1 combiners discussed supra. Based on such assessments, the power consumption analysis is addressed to find the most promising architecture without impairing signal quality.

2A. Architectures

Figure 10:
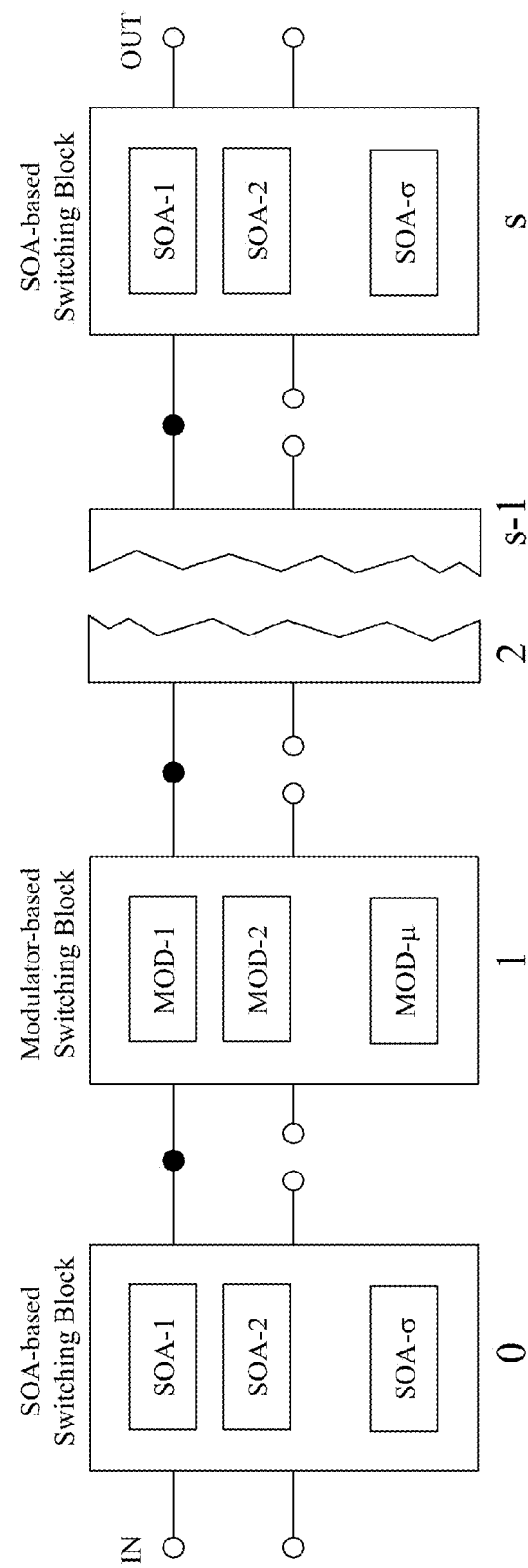
FIG. 10 depicts heterogeneous switching blocks based on either SOAs or modulators according to embodiments of the invention.

Within this section we evaluate the number of SOAs and modulators required in the most relevant non-blocking architectures for large space switches, see Dally. Each architecture A has n input and n output ports, interconnected by one or multiple stages of basic switching blocks. Unless otherwise stated, the basic switching block is a 2×2 optical switch that can be realized with a single stage of gating elements (in particular, σ SOAs or μ modulator-based gates. An example of such a switching block is shown in FIG. 10 wherein packets propagate from the input ports on the left and are switched to the output ports on the right along the established paths highlighted with black dots. Thus, if $N_A$ is the total number of switching blocks of architecture A, then $S_A$ switching blocks are SOA-based and $M_A = N_A - S_A$ are modulator-based. Therefore, the total number of SOAs in A, $W_A$, is $W_A = S_A \sigma$. Similarly, the total number of modulator-based gates is $Y_A = M_A \mu$.

The values of $N_A$ and $S_A$ are derived for the different non-blocking architectures assuming that each s-th switching block must be SOA-based, as shown in FIG. 10, i.e., the maximum number of modulator-based switching blocks that can be traversed by a packet routed from an input port to an output port before requiring amplification by an SOA is equal to (s−1). In all considered architectures, the SOA-based switching blocks are arranged to minimize the overall number of SOAs, for a given value of the parameters.

2A1. Crossbar Architecture:

In crossbar interconnection architectures, inputs and outputs are connected by means of a matrix: to connect input i to output j, the switching block in position (i, j) must be set to the bar state, whereas the other elements on row i or column j are set to cross state. Therefore, the number of switching blocks is $N_{XBAR} = n^2$. The SOA-based switching blocks can be placed along the matrix diagonals (from top right to bottom left), spaced by s, so that no routing path crosses more than (s−1) consecutive modulators before reaching an SOA. Without loss of generality, the placement of the diagonals with SOA based switching blocks can be carried out starting from the top leftmost element. The total number of SOA-based switching blocks is therefore given by Equations (1A) and (1B).

$$S_{XBAR} = \sum_{i=0}^{a-1}(s \cdot i + 1) + \sum_{i=a}^{b-1}(2n - s \cdot i - 1) \tag{1A}$$

$$S_{XBAR} = a + (2n-1)(b-a) - \frac{s}{2}(b^2 - b - 2a^2 + 2a) \tag{1B}$$

where $$a = \left[\frac{n}{s}\right] \text{ and } b = \left[\frac{2n-1}{s}\right].$$

The first term of Equation (1A) accounts for the SOA-based switching blocks above the main diagonal whilst the second term of Equation (1B) accounts for those below and on the main diagonal.

2A2. Benes Architecture:

The Benes (Be) architecture derives itself from a Clos switch which is expanded until 2×2 switching blocks are used. The Benes architecture has 2 log n−1 stages, each of them composed of n/2 switching blocks. Hence $$N_{Be} = \frac{n}{2} \cdot (2\log n - 1).$$

Since the number of crossed switching blocks is the same for every path and equal to the number of stages in the architecture, the SOA-based switching blocks can be placed every s-th stages. Without loss of generality, the first stage is set as an SOA based type. Thus the number of SOA-based switching blocks in the Benes architecture is given by Equation (2).

$$S_{Be} = \left\lceil \frac{2\log n - 1}{s} \right\rceil \cdot \frac{n}{2} \qquad (2)$$

2A3. Spanke Architecture:

The Spanke (Sp) architecture differs from the other architectures considered which are based on 2×2 switching blocks in that consists of n 1×n switches, each of them connected to n n×1 switches. In common with the analysis supra in Section 1 an optical implementation based on trees is considered wherein an input 1×n switch can be implemented as a binary tree with log n stages of 1:2 splitters and a final stage of gating elements, see for example Liboiron2. Similarly, the output n×1 switch can be implemented as a binary tree with log n stages of 2:1 couplers. Due to the loss of such passive splitters and couplers amplification is required every s' stages of splitters/couplers. Note that the value of s' may be different from s since the power penalty of a splitter/coupler can be different from that of a modulator. As presented in Liboiron2 gating elements are only required at the last stage of the 1×n space switch. To reduce the overall number of SOAs, the modulators are thus placed at the last stage, for a total of $Y_{Sp} = n^2$. To avoid an excessive degradation of the optical signal quality, SOAs are placed every s' stages. Further, in order to minimize SOA usage they are placed symmetrically with reference to the gating stage, thus avoiding the largest levels of the binary tree.

With this placement, the total number of amplification stages $A_L$ and $A_R$ required for the 1×n and n×1 space switches respectively are as given by Equations (3) and (4). Accordingly, the number of SOAs $W_L$ and $W_R$ in the 1×n and n×1 space switches is given by Equations (5) and (6) where $i_L = \log n - [\mu/2]$ and $i_R = \log n - \mu + [\mu/2]$ are the indices of the first amplification stage placed on the left and on the right of the modulation stage, respectively.

$$A_L = \left\lceil \frac{\log n + 1 - [\mu/2]}{s'} \right\rceil \qquad (3)$$

$$A_R = \left\lceil \frac{\log n + 1 - [\mu - (\mu/2)]}{s'} \right\rceil \qquad (4)$$

$$W_L = \sum_{k=0}^{A_L - 1} 2^{i_L - k s'} = 2^{i_L} \frac{1 - 2^{-s' A_L}}{1 - 2^{-s'}} \qquad (5)$$

$$W_R = \sum_{k=0}^{A_R - 1} 2^{i_R - k s'} = 2^{i_R} \frac{1 - 2^{-s' A_R}}{1 - 2^{-s'}} \qquad (6)$$

Since the n×n Spanke consists of n 1×n switches and n n×1 switches, the total number of SOAs required in the Spanke architecture is given by Equation (7).

$$W_{Sp} = n(W_L + W_R) = n \frac{2^{i_L}(1 - 2^{-s' A_L}) + 2^{i_R}(1 - 2^{-s' A_R})}{1 - 2^{-s'}} \qquad (7)$$

2A4. Spanke-Benes:

The Spanke-Benes (Sp-Be) architecture, also called n-stage planar, is a hybrid between the two previous architectures. It consists of n stages and $$N_{Sp-Be} = \frac{n(n-1)}{2}$$

switching blocks. It is constructed by alternating a stage of (n/2) switching blocks with a stage of $$\frac{n}{2} - 1.$$

Thus, the SOA-based switching blocks have to be placed only in the stage with (n/2) switching blocks. By starting the placement from the first stage, the total number of SOA-based switching blocks is given by Equation (8).

$$S_{Sp-Be} = \left\lceil \frac{n/2}{\lceil s/2 \rceil} \right\rceil \cdot \frac{n}{2} \qquad (8)$$

2A5. Clos-Based Hybrid Architectures:

A Clos architecture is a class of interconnection networks that uses multi-stage space switches, and is suitable to build switches with a high port count. It consists of three stages. A re-arrangeably non-blocking Clos architecture with the minimum number of switching blocks can be realized with a first and third stage of 2p p×p switches and a middle stage of p 2p×2p switches where $p = \sqrt{n/2}$. The total number of switching blocks is $N_{CLOS} = 4p \cdot N_{p \times p} + p \cdot N_{2p \times 2p}$, where $N_{p \times p}$ and $N_{2p \times 2p}$ are the number of switching blocks in a p×p and 2p×2p space switch, respectively.

To realize the p×p and 2p×2p space switches, only the Spanke and Benes architectures are considered as they require fewer switching blocks. Due to symmetry, first and third stages are implemented using the same architecture. Accordingly, the four possible hybrid Clos architectures are denoted as Sp-Be-Sp, Be-Sp-Be, Sp-Sp-Sp and Be-Be-Be, where each stage is a either Spanke (Sp) or Benes (Be) architecture.

In the Be-Be-Be architecture, the total number of stages can be derived as described in Section 2A2 and is equal to 2(2 log p−1)+2 log p−1=6 log p−1. When placing the first SOA-based switching block on the leftmost stage, the total number of SOA-based switching blocks is given by Equation (9).

$$S_{Be-Be-Be} = \left\lceil \frac{6\log p - 1}{s} \right\rceil p^2 = \left\lceil \frac{3\log n - 4}{s} \right\rceil \frac{n}{2} \qquad (9)$$

In the Sp-Sp-Sp architecture, the optimal placement of the SOA-based switching blocks is carried out from the center. Hence $W_{Sp}(x)$ is the number of SOAs required in a x×x Spanke architecture given in Equation (7) with x=n and is given by Equation (10).

$$W_{Sp-Sp-Sp} 4p W_{Sp}(p) + p W_{Sp}(2p) \qquad (10)$$

In a similar way, the Sp-Be-Sp and Be-Sp-Be architectures consist of 4p p×p switches for the first and second stage and p 2p×2p for the second stage. The number of SOAs is given by Equations (11) and (12) for the Sp-Be-Sp and Be-Sp-Be architectures respectively.

$$W_{Sp\text{-}Be\text{-}Sp} = 4pW_{Sp}(p) + pS_{Be}(2p)\sigma \quad (11)$$

$$W_{Be\text{-}Sp\text{-}Be} = 4pS_{Be}(p)\sigma + pW_{Sp}(2p) \quad (12)$$

2B: Results

Based upon the different architectures defined above in respect of Section 2A a comparison of the different architectures in terms of number of switching blocks and power consumption is carried out. The analysis exploits the implementation of SOA-based switching blocks proposed in Albores-Mejia, consisting of two SOAs ($\sigma=2$), of which only one is active in both cross and bar configurations. Modulator-based switching blocks are implemented with two MZI ($\mu=2$), see for example Lee et al in "Demonstration of a Digital CMOS Driver Codesigned and Integrated with a Broadband Silicon Photonic Switch" (J. of Light. Tech., Vol. 29, pp. 1136-1142) and Campenhout et al in "Low Power, 2×2 Silicon Electro-Optic Switch with 110 nm Bandwidth for Broadband Reconfigurable Optical Networks" (Opt. Express, Vol. 17, pp. 24020-24029).

The maximum number of passive elements, i.e. modulator based gates, splitters, or couplers, that can be crossed before an amplifier is set to 4, i.e. s–s'=5. This number has been chosen such that the loss does not to exceed the maximum gain of the SOA, i.e., the power losses of the s (or s') stages of passive elements are compensated by the stage of SOA-based gating elements. To minimize the power consumption, only the SOAs in the switching blocks along the path(s) are considered enabled to active state, while all the other SOAs are left idle. As discussed supra to reduce the switching time, SOAs in idle state are fed with a current slightly below the threshold required for amplification. In idle state, SOAs will therefore drain a non-negligible amount of power. In the following, maximum network utilization is considered, in which each input port is connected to a different output port (for a total of n paths simultaneously active). Instead the MZI can be either in active state or in OFF state consuming a negligible amount of power. The power consumption is derived by assuming a normalized power consumption of 1 and 0.01 for an active and idle SOA, see for example Liboiron1 and Liboiron2, respectively, and 0.005 for the active MZI, see for example Lee. Such values include the power consumption of the respective drivers. The SOA power consumption is referred to the unsaturated gain.

Figure 11:
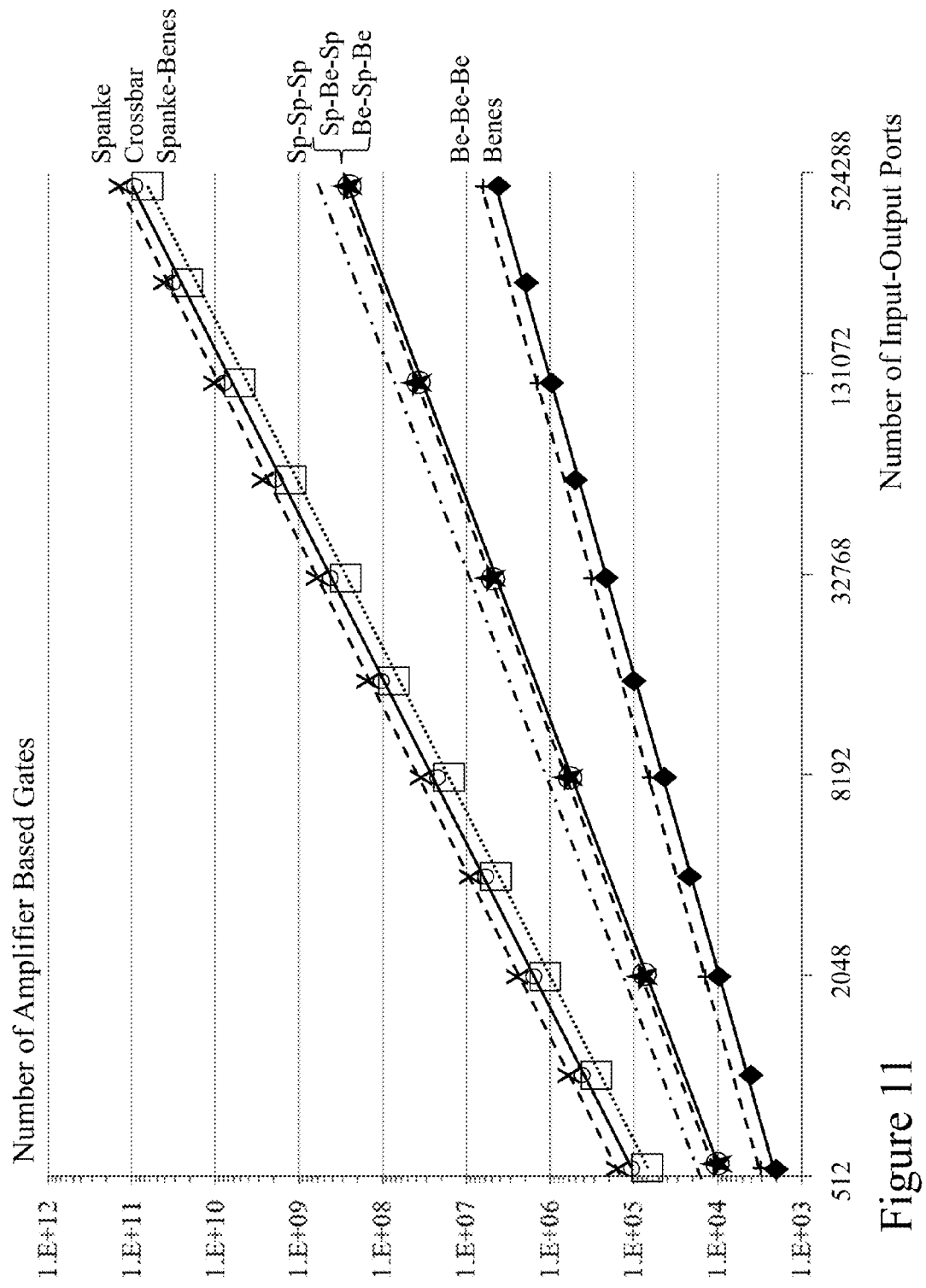
FIG. 11 depicts the number of SOAs versus number of switch ports for considered architectures according to embodiments of the invention.
Figure 12:
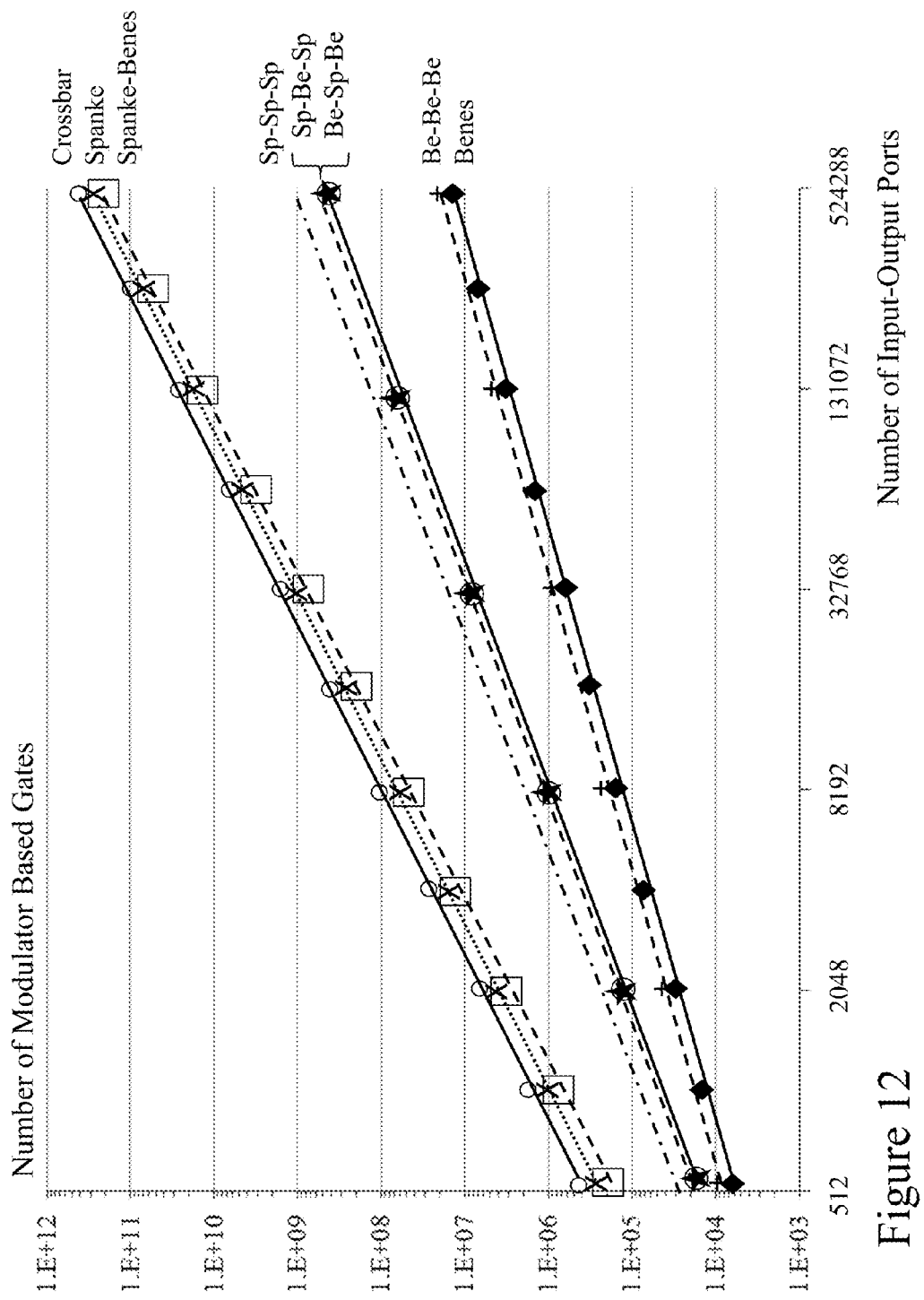
FIG. 12 depicts the number of modulator based gates versus number of switch ports for considered architectures according to embodiments of the invention.

2B1. Number of Gating Elements:

FIG. 11 depicts the total number of SOAs needed for each architecture versus the number of input/output ports n. As is evident the crossbar, Spanke-Benes, and Spanke architectures require the highest number of SOAs, owing to the poor asymptotical scaling with $n^2n2$. Clos architectures with at least one Spanke stage (namely Sp-Sp-Sp, Sp-Be-Sp and Be-Sp-Be) perform slightly better, scaling asymptotically with $n^{3/2}$, whilst the Benes and Be-Be-Be architectures have the minimum requirement of SOAs, each scaling with n log n. The total number of modulators required in the different architectures is shown in FIG. 12 and follows trends which are similar to the total number of SOAs as depicted in FIG. 11.

Figure 13:
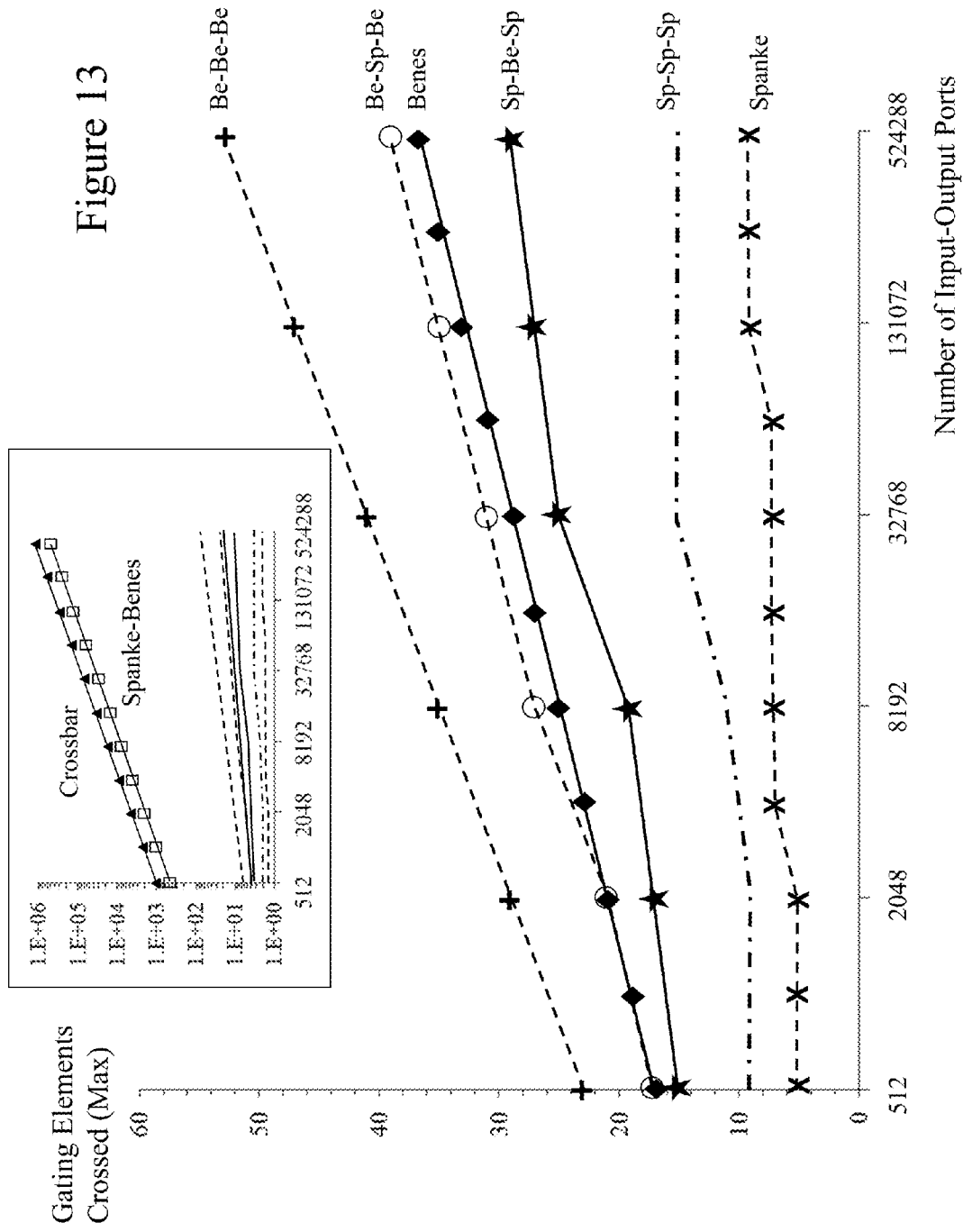
FIG. 13 depicts the maximum number of gating elements crossed versus number of switch ports for considered architectures according to embodiment of the invention.

Now referring to FIG. 13 there are depicted the maximum total number of crossed gating crossed, i.e., SOA-based and modulator-based. The inset shows a logarithmic y-axis, while the bigger graph provides a zoom of the lower part of the inset due to the substantial differences between the architectures. As evident the high number of crossed gating elements impacts negatively the feasibility of the Spanke-Benes and crossbar architectures as the number of gated elements scale with n and are the same order of magnitude as n. Hence, at 2048 ports the number of crossed elements is already several thousand. However, the Spanke architecture and hybrid Clos architecture (Sp-Sp-Sp) based on Spanke exhibit the least number of elements crossed, a beneficial characteristic to reduce physical impairments. The maximum number of SOAs crossed in the largest configuration (219 ports) is less than 13 for all architectures, with the exceptions for crossbar and Spanke-Benes. Accordingly, it is evident that whilst the Benes and Be-Be-Be architectures require smallest number of gating elements, leading to reduced complexity and cost, that the lowest number of gating elements crossed is lowest with the Spanke and Sp-Sp-Sp architectures, such that these lead to lowest optical degradation/physical impairment. Accordingly, a tradeoff between these two desired characteristics of an interconnection network is required.

Figure 14:
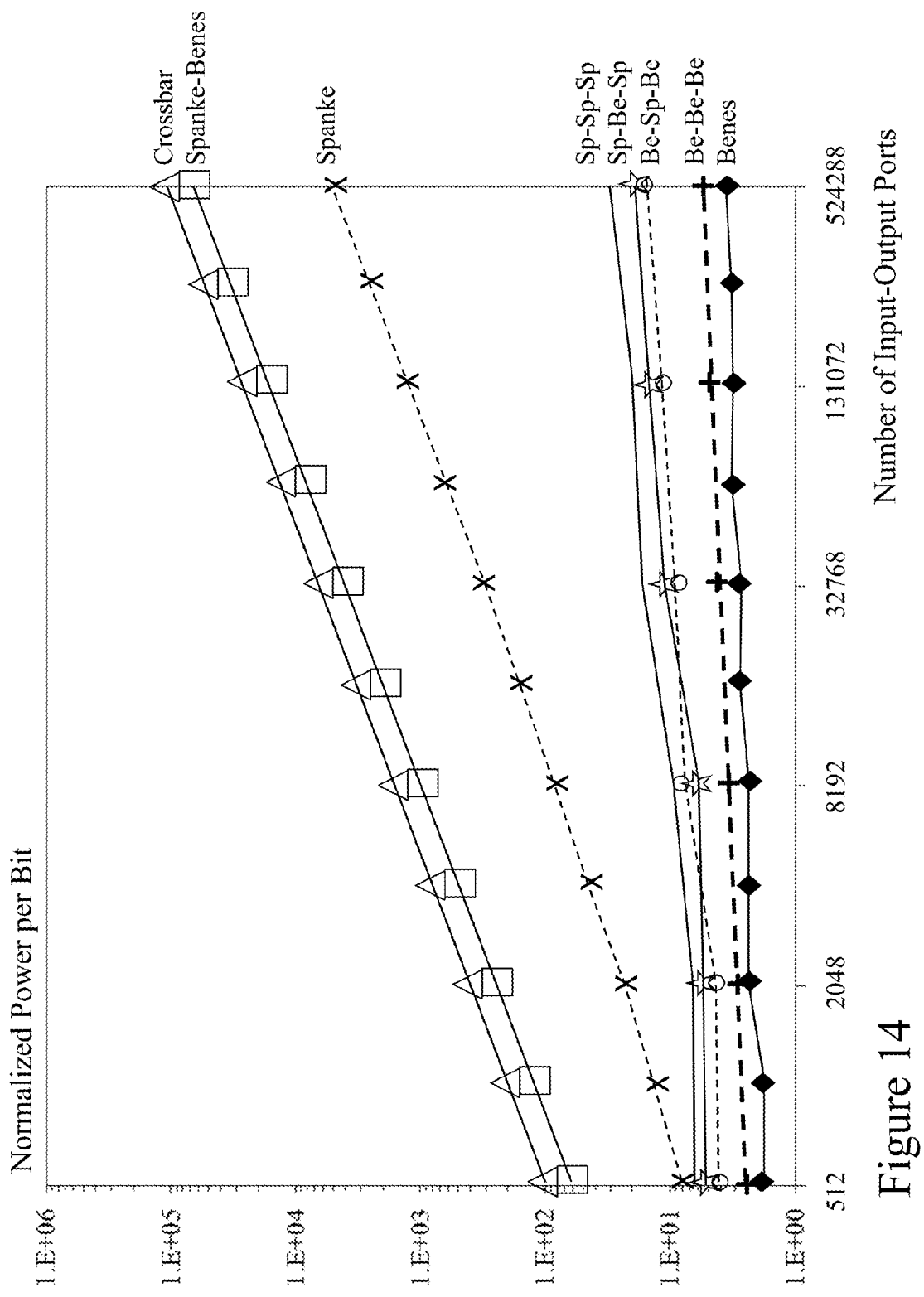
FIG. 14 depicts the normalized power per port versus number of switch ports for considered architectures according to embodiment of the invention.

2B2. Power Consumption:

Now referring to FIG. 14 the power consumption per port of the different architectures is plotted as a function of the number of input-output ports. As evident from this the power consumption per port for the Crossbar, Spanke-Benes, and Spanke architectures increases with the number of ports. In the Crossbar and Spanke-Benes architectures this arises from the fact that the number of active and idle SOAs scales with $n^2$. The behaviour of Spanke architecture is due to the high number of SOAs, see FIG. 11, even if most of them are in the idle state. The other architectures drain less power, especially the Benes and Be-Be-Be architectures.

Figure 15:
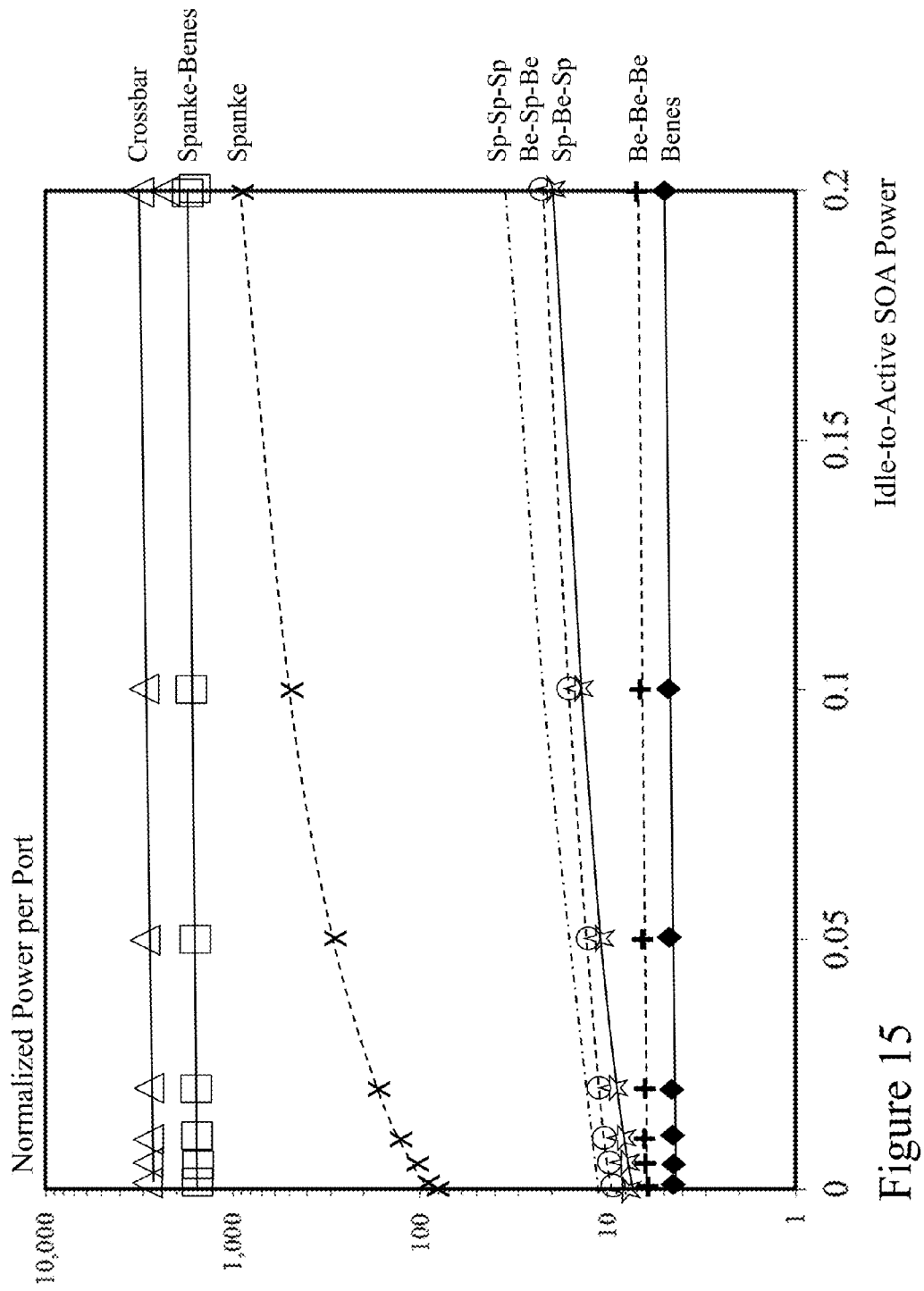
FIG. 15 depicts a sensitivity analysis of the normalized power consumption per port versus idle-to-active power ratio of the SOA for an interconnection architecture with $2^{13}$ ports for considered architectures according to embodiment of the invention.

A sensitivity analysis of these architectures has been performed to investigate how the power consumption per port is affected by the power dissipation of the SOAs in the idle mode of operation. These results are presented in FIG. 15 wherein the x-axis represents the power drained by an idle SOA when the power drained by the SOA in its active state is normalized to 1. A $2^{13}$ input/output port configuration was considered. As can be seen the Benes and Be-Be-Be are the architectures with the lowest sensitivity to the idle power consumption. This behaviour arises due to the high ratio of active SOAs to the total number of SOAs needed, which makes the contribution of the idle SOAs negligible compared to the total power consumption. In contrast the Crossbar and Spanke-Benes architectures are also essentially unaffected by the variation of idle power consumption, even though the total power consumption is the highest. However, the Spanke architecture is the most sensitive configuration, due to the high percentage of idle SOAs compared to the total number of SOAs. Accordingly, the Spanke architecture has the potential to be very power efficient when realized with SOAs that have negligible idle power consumption. It is also evident that Clos architectures based on Spanke structures in at least one stage are also influenced by this dependence, even though in a less critical way, due to the reduced total number of SOAs required.

TABLE 1

Power Consumption for Different Values of s and 8192 Ports

|  | Normalized Power/Port | | | Power Consumption | |
| --- | --- | --- | --- | --- | --- |
|  | Homogeneous | Heterogeneous | | Reduction (%) | |
|  | s = 1 | s = 3 | s = 5 | s = 3 | s = 5 |
| Crossbar | 8274.00 | 2812.00 | 1720.00 | 66.0 | 79.2 |
| Benes (Be) | 12.62 | 4.55 | 2.53 | 64.0 | 80.0 |
| Spanke (Sp) | 396.12 | 144.48 | 89.18 | 63.5 | 77.5 |
| Spanke-Benes | 4137.00 | 2089.00 | 1065.00 | 49.5 | 74.3 |
| Be-Be-Be | 17.67 | 6.17 | 3.67 | 65.0 | 79.2 |
| Sp-Sp-Sp | 55.12 | 18.04 | 10.50 | 67.3 | 81.0 |
| Be-Sp-Be | 32.69 | 12.15 | 8.37 | 62.9 | 74.4 |
| Sp-Be-Sp | 40.10 | 12.56 | 6.80 | 68.7 | 83.1 |

Table 1 outlines the power consumption of the different architectures with $2^{13}=8192$ input/output ports in a homogeneous space switch (s=1) and in heterogeneous space switches with s=3 and s=5. As evident from Table 1 the reduction in power consumption per port in the heterogenous implementation with respect to the homogeneous implementation is approximately 60% when s=3 and reaches approximately 80% when s=5. This reduction is due to the lower power consumption of modulator-based switching blocks compared to SOA-based switching blocks. The lower power consumption reduction in the Spanke-Benes architecture is due to the placement strategy of the modulator based switching blocks, which cannot be optimized unlike the other architectures.

3: System Performance of Heterogeneous Interconnection Network

Within the preceding Section 2 the optical interconnection concepts established in Section 1 with respect to multi-plane Space-Time interconnection networks were progressed to address alternate interconnection architectures in respect of complexity and power consumption by exploiting interferometric and SOA based gates to generate novel heterogeneous switch fabrics. Accordingly, in this section the performance of such heterogeneous switches is compared with the prior art homogeneous switch architecture.

3A. Exemplary Spanke Optical Space Switch:

A space switch with N input and N output ports arranged in a Spanke architecture is considered, see Liboiron1, where each input port is connected to an 1×N optical switch and each output port is connected to a N:1 coupler. Each 1×N switch consists of a binary tree of 1:2 splitters, while each N:1 coupler consists of a binary tree of 2:1 couplers. A stage of optical gates is needed in the last stage of each 1:N such that given a packet at an input port, for each possible output selection only one optical gate is enabled (closed), allowing the packet to be routed to the desired output, while the remaining N−1 are disabled (open). To recover the inherent splitting losses, amplification stages of SOAs are introduced along the paths. We define the maximum span, namely the number of passive elements such as couplers, splitters, MZI gates, etc., between two consecutive SOAs as s and this depends upon the loss of the passive elements and the gain of the SOAs.

Figure 16:
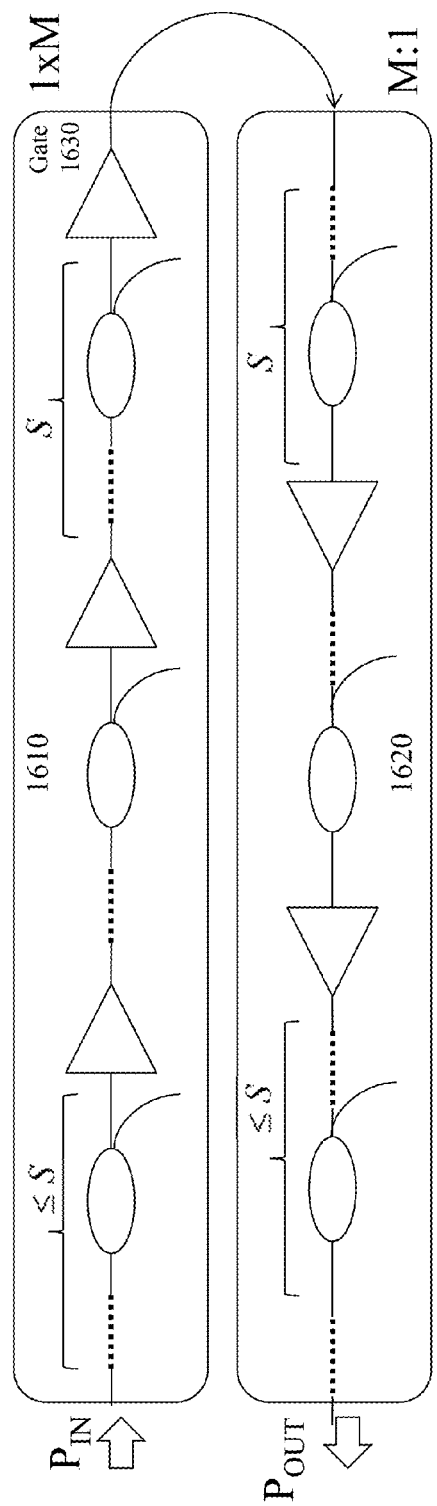
FIG. 16 depicts a signal path for a homogenous SOA based gating for optical interconnections according to an embodiment of the invention.
Figure 17:
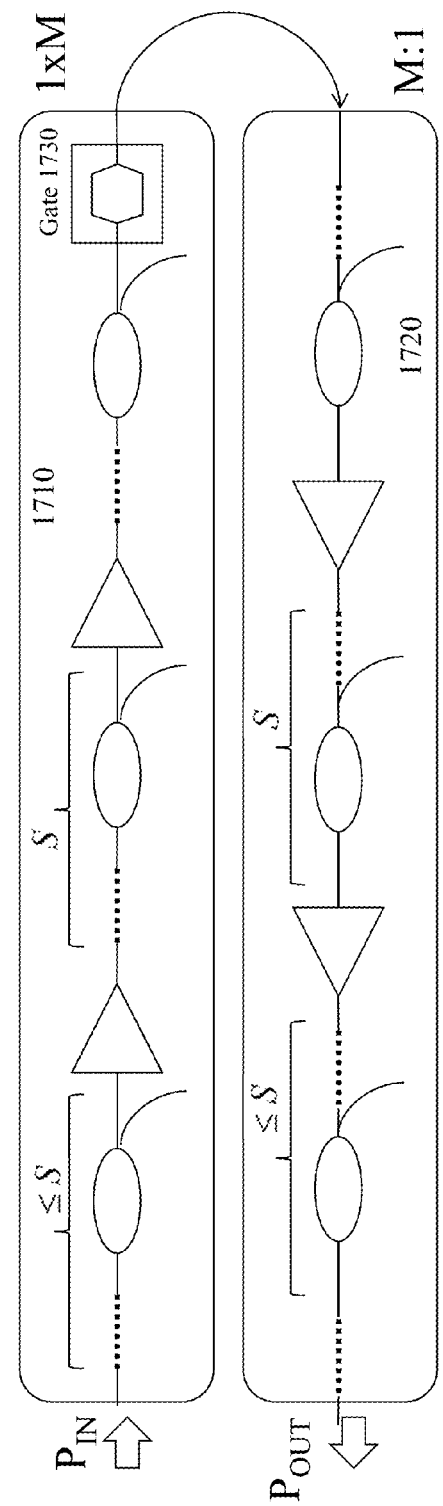
FIG. 17 depicts a signal path for a heterogeneous based gating for optical interconnections according to an embodiment of the invention.

The paths traversed by a packet in the prior art homogeneous SOA-based and heterogeneous architecture according to an embodiment of the invention are depicted in FIGS. 16 and 17 respectively. In homogeneous SOA-based implementation depicted in FIG. 16 with 1×N switch 1610 and N:1 coupler 1620 the number of amplifiers is minimized by placing the amplification stages starting from the SOA output gate 1630 stage within the 1×N switch 1610 and proceeding backward every s stages of splitters. For the N:1 coupler 1620 the number of amplifiers is minimized by placing the amplification stages starting from the output and proceeding backward every s stages of couplers. The number of SOAs in the last stage of the 1×N switch is $N^2$. In the heterogeneous implementation according to an embodiment of the invention as depicted in FIG. 17, the SOA output gate 1630 is replaced by a stage of interferometric gates 1730, e.g. MZI gates. The number of SOAs is minimized by placing the first amplification stage evenly spaced from the interferometric gate 1730 within the 1×N switch 1710 and then proceeding backward towards the input, according to the maximum spacing s. Similarly, for the N:1 coupler 1720 the number of amplifiers is minimized by placing the amplification stages starting from the output and proceeding backward every s stages of couplers. Accordingly, the amplification elements, e.g. SOAs, are placed as far as possible from the last stage of the binary tree, thereby reducing the overall number of required SOAs and hence power consumption of the switch fabric.

3B. Exemplary Spanke Network Simulation Results:

A physical layer analysis has been carried out using a commercial optical system simulator (OptiSystem). The parameters were set in common with those described above, see also Tanaka and Lee, wherein the SOAs have a noise figure of 8.6 dB, a saturated output power of +15.6 dBm, and an unsaturated gain value of 14.3 dB. The interferometric gates simulated were Mach-Zehnder interferometers (MZI) with an insertion loss <3 dB, a crosstalk <−18 dB and a reported power consumption of 2 mW including the integrated CMOS driver circuit. Since the wavelength domain can be exploited together with the space domain, see for example Liboiron1 and Liboiron2, and accordingly 8 wavelengths modulated at 25 Gb/s were employed within the simulations. For the given maximum gain of the SOA, the maximum span between SOAs was set to s=5.

Figure 18:
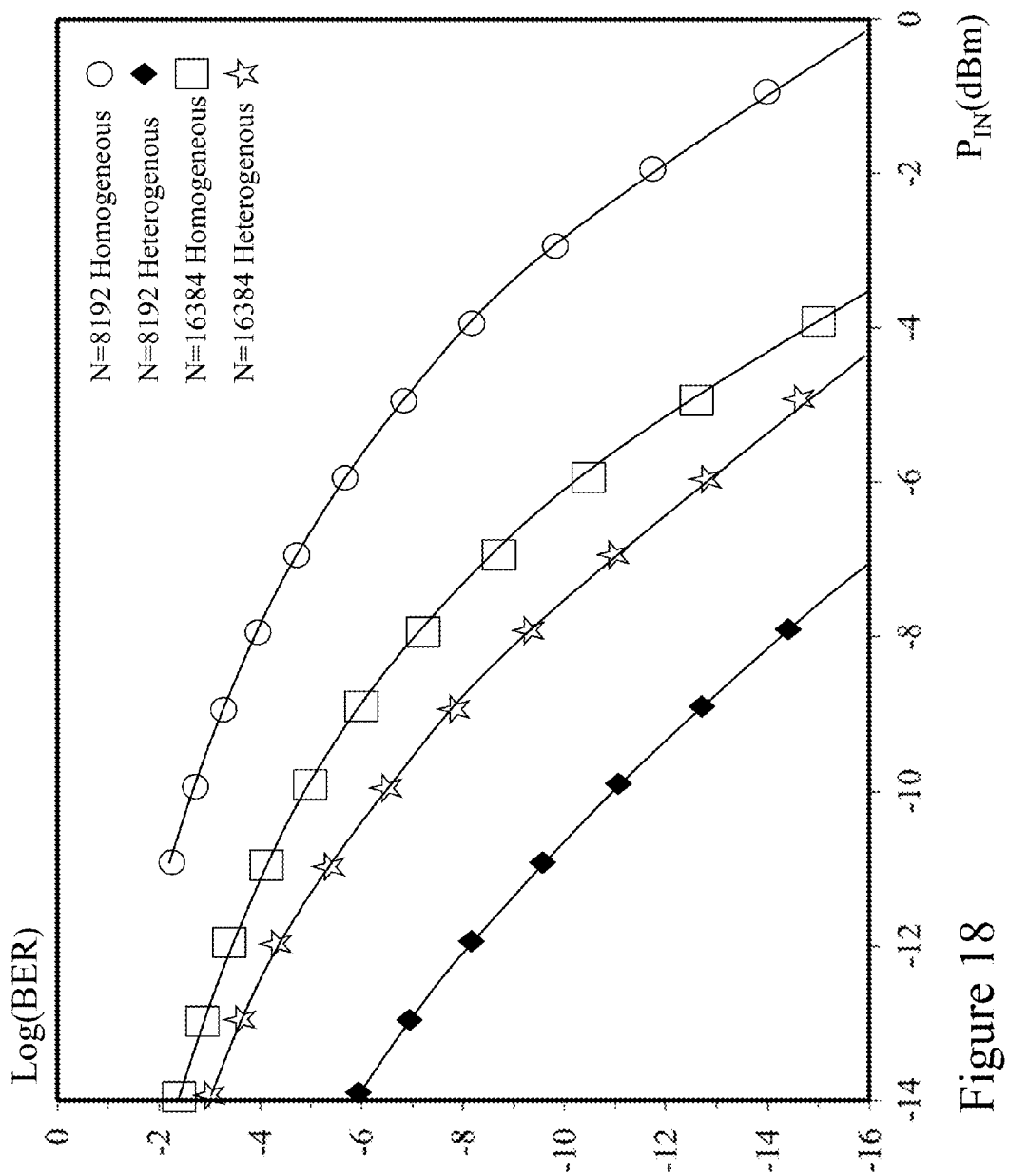
FIG. 18 depicts BER versus optical input power for heterogeneous and homogeneous architectures according to embodiments of the invention.

The signal traversing the N:1 coupler 1720 in the heterogeneous configuration depicted in FIG. 17 is impaired by the presence of in-band crosstalk leaked from the MZI gate 1730. Referring to FIG. 18 there is depicted the logarithm of the Bit-Error Rate (BER) of the worst channel versus the optical input power ($P_{IN}$) of this channel in two switch configurations, with N=8192 and N=16384 ports. In both configurations, the heterogeneous implementation requires a lower input power ($P_{IN}$) to achieve the same BER performance of the SOA-based implementation. In particular, in the heterogeneous implementation, the input optical power at BER=$10^{-12}$ reduced by more than 4 dB for N=8192 and 4.5 dB for N=16384 ports. This performance improvement is due to the amplified spontaneous emission (ASE) noise difference, as a result of the different placement of the amplification stages in the two implementations. Since the first SOA crossed by the signal entering in the space switch can be assumed to work far from saturation, the noise figure remains constant, and hence the ASE spectral density increases with the gain. Due to the SOA placement, the first SOA of the SOA-based implementation needs to compensate at higher loss and thus higher noise is experienced leading to the degradation in performance.

Figure 19:
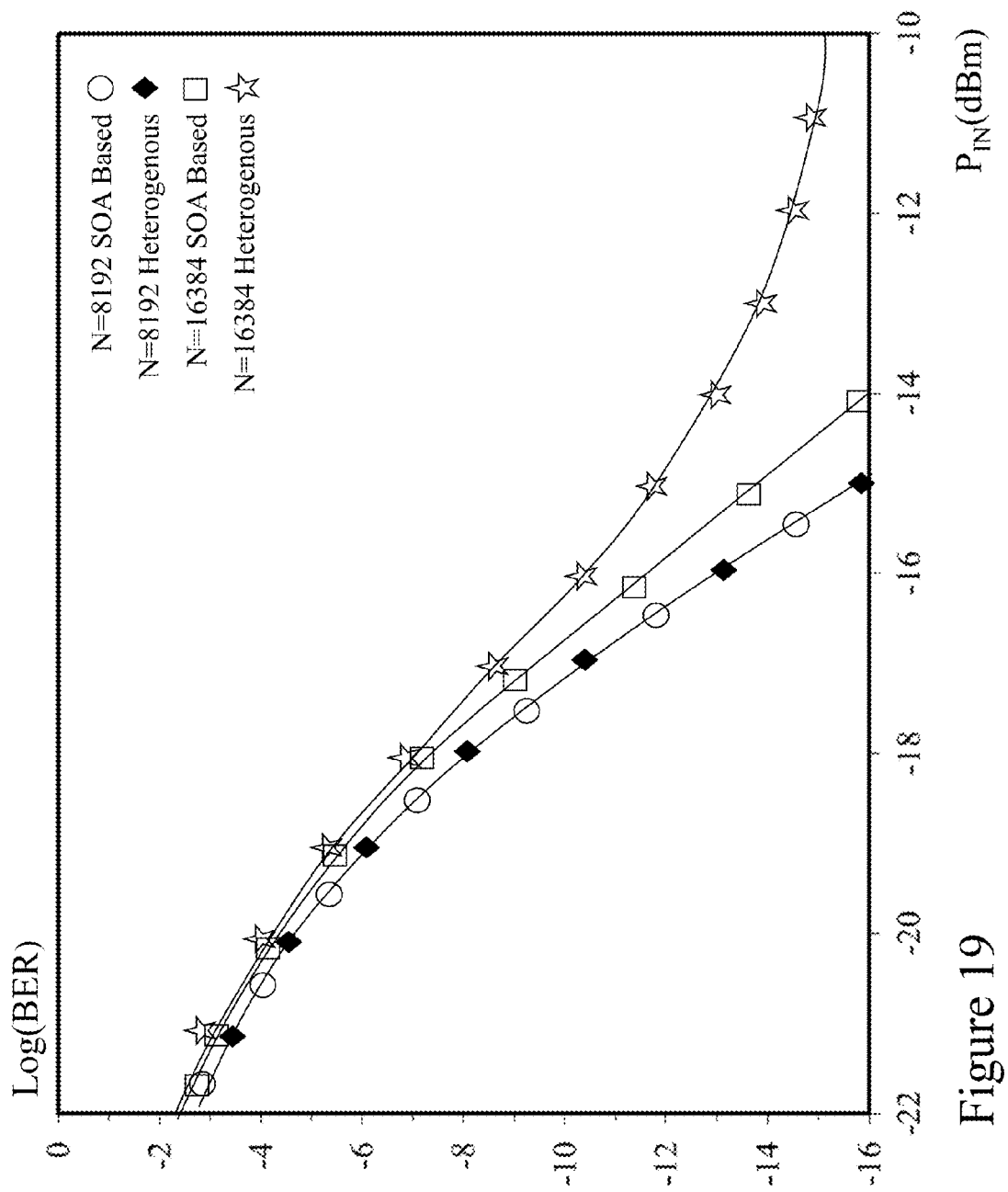
FIG. 19 depicts BER versus optical output power for heterogeneous and homogeneous architectures according to embodiments of the invention.
Figure 20:
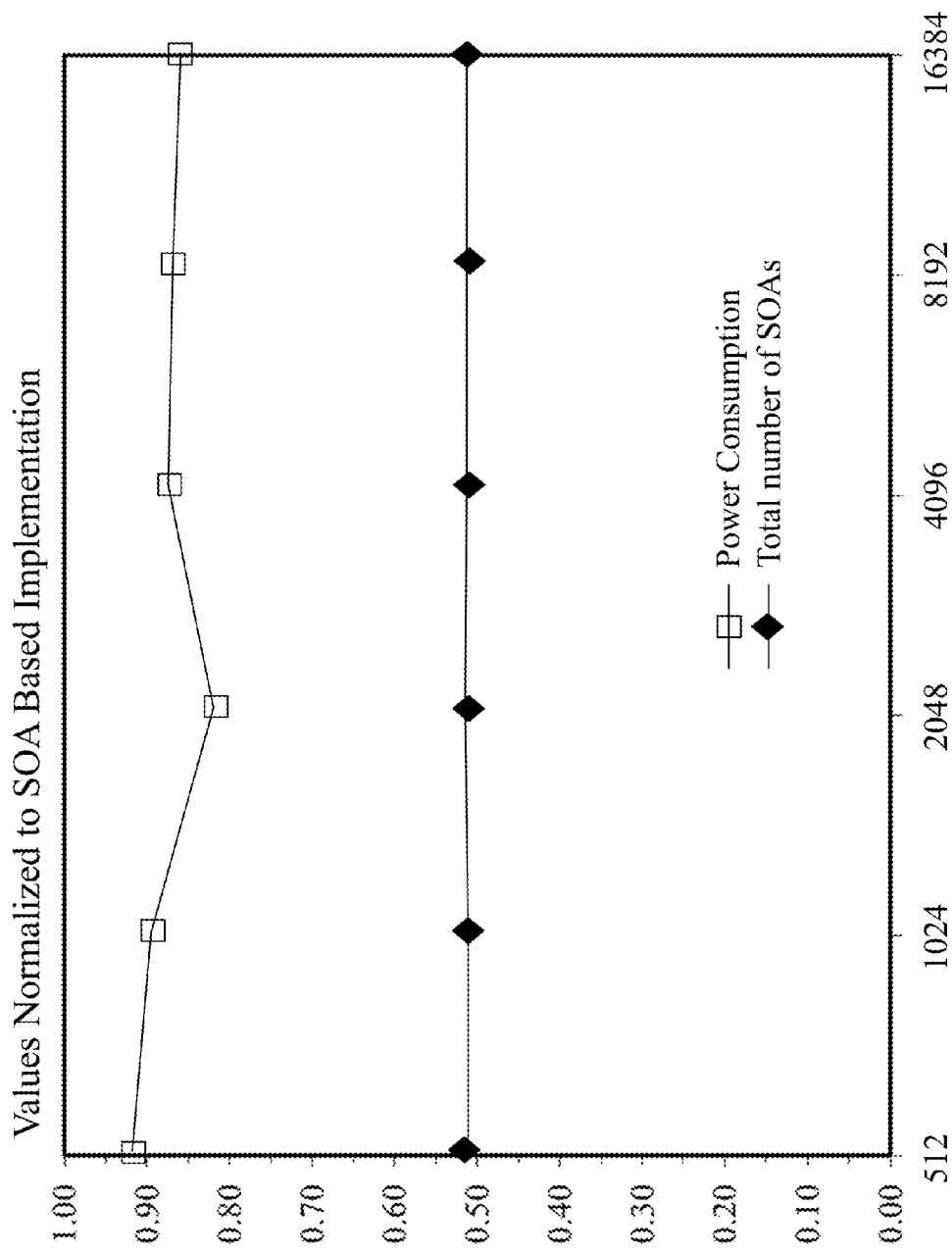
FIG. 20 depicts power consumption and total number of SOAs in the heterogeneous switch normalized to the SOA-based homogeneous switch.

Now referring to FIG. 19 there is depicted the logarithm of the BER versus the output optical power for an optical input power of −2 dBm in the same switch configurations as FIG. 18. The penalty at BER=$10^{-12}$ of the heterogeneous implementation with respect to the SOA-based one is very small for N=16384 ports at <1 dB whilst both implementations undergo the same penalty for N=8192 ports. Now referring to FIG. 20 there is depicted the total number of SOAs and the power drained by the heterogeneous implementation, normalized to the SOA-based switch for increasing number of ports N. As evident from this the number of SOAs is reduced by almost 50% for all the considered switch configurations, while the reduction of total power consumption is more than 10%. The reduction in power consumption and number of SOAs is achieved thanks to the optimized placement of the amplification stages. The heterogeneous implementation requires the same number of SOA stages as in the homogeneous SOA-based implementation but these are placed closer to the input (output) of the switch (coupler) binary tree, and the number of active SOAs crossed by the signal is the same. The only exception, N=2048, rises as the heterogeneous implementation requires two less SOA stages than the homogeneous implementation leading to the increased reduction in power consumption of approximately 20%.

It would be evident to one skilled in the art that whilst the optical splitters, e.g. 1:N splitter or 1:N optical switch, and optical combiners, e.g. N:1 combiner, have been described as based upon sequential stages of 1×2 and 2×1 elements. However, it would be evident that according to other embodiments of the invention 2×2 elements may be employed without changing the architectures described. However, within some photonic technologies implementations of these optical splitters, optical switches, and optical combiners may exploit R×S elements wherein R= 1, 2, 3, 4 . . . and S=1, 2, 3, 4 . . . . For example, in fused biconic fiber technologies 1×3 and 1×4 splitters may be fabricated either to reduce insertion losses overall, i.e. $L_{1\times4} < 2 \times L_{1\times2}$, or provide splitters with channel counts not compatible with $N=2^n$, e.g. N=27, N=768, and N=3,072 for example.

It would also be evident to one skilled in the art that according to embodiments of the invention that implementations of the optical transmitters, optical receivers, optical splitters, optical combiners, optical switches, and optical interconnection network may exploit one or more technologies including fused biconic tapers (FBT), fiber-based Bragg gratings, free-space optics, passive photonic integrated circuits (PICs) such as those based upon glass, polymer, silicon oxynitride, and ferroelectrics for example, active PICs such as those based upon rare earth doped glass, rare earth doped silica, polymers, and semiconductors for example; and combinations thereof such that those exploiting hybrid integration, free space coupling, etc. For example, high index silicon oxynitride waveguides may be employed to provide the different FSR couplers as well as the required time delays and interferometric gates with hybrid integration of SOAs or externally coupled laser arrays to pump integrated rare-earth doped waveguide amplifiers. Whilst focus has been given to solutions that leverage hybrid and/or monolithic integration using PICs it would be evident that non-PIC based solutions exploiting FBTs in combination with thin film filters (TFFs) and erbium-doped fiber amplifiers (EDFAs) may similarly be deployed. Optionally, partitioning of the architecture may be varied such that a WDM signal is transmitted from a transmitter to a remote node comprising the parallel wavelength-striped mapping, e.g. PWM Circuit 230, and Time Slot Packet Generator 240. Similarly, the parallel wavelength-striped mapping reversal circuit 270 may be remotely disposed with respect to the receiver (Broadband O/E 280).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:
1. A method of routing comprising:
providing a plurality of M input cards, each input card having a plurality of input ports for receiving electrical signals for transmission from source device, an optical output connected to an input port of an optical interconnection network;
providing a plurality of M output cards, each output card having an optical input connected to an output port of the optical interconnection network and a plurality of output ports for transmitting electrical signals to destination devices;
providing the optical interconnection network comprising a M×M fast space switch;
providing an inter-card scheduler for controlling reconfiguration of the M×M fast space switch, the inter-card scheduler also in communication with the plurality of input cards;
generating a plurality of time-compressed wavelength division multiplexed (WDM) packets at an input card of the plurality of input card, wherein each time-compressed WDM packet corresponding to a serial electrical data packet from an input port of the plurality of N input ports of the input card and for transmission upon a predetermined sub-slot of a plurality of sub-slots, wherein the predetermined sub-slot is determined by an intra-card scheduler in dependence upon the target output port of the plurality of output ports of a target output card and the target output card, where each of the time-compressed packets is generated by encoding serial electrical data from the corresponding input port of the plurality of input ports into parallel optical data at the optical output through the process of:
receiving an electrical serial data packet for transmission comprising a predetermined number of bits;

encoding each bit of the electrical serial data packet onto a predetermined wavelength of a plurality of wavelengths;

delaying each wavelength of the plurality of wavelengths by a first predetermined time delay;

multiplexing the delayed plurality of wavelengths by a multiplexer;

gating with a first gate the plurality of wavelengths to form a parallel optical time-compressed WDM packet, wherein the gated wavelengths are all aligned in time in the predetermined sub-slot; and combining and coupling to the optical output of the input card N optical time-compressed WDM packets each corresponding to one of the input port of the N input ports of the input card of the plurality of input cards, each optical time-compressed WDM packet in a sub-slot of the plurality of sub-slots;

transmitting the optical time-compressed WDM packets from the input card of the plurality of input cards to the target output card of the plurality of output cards via the optical interconnection network which is established into a predetermined switching configuration by the scheduler; and generating an electrical output signal at the target output port of the plurality of output ports of a target output card, wherein the electrical output signal is generated by converting at a receiver the optical true-compressed WDM packets to output serial electrical data through the process of:

receiving at a single optical input of the receiver the plurality of optical time-compressed WDM packets;

splitting each of the plurality of optical time-compressed WDM packets into N portions each coupling to a second gate;

gating with the second gate the time-compressed WDM packet;

delaying each gated wavelength of the time-compressed WDM packet by a second predetermined time delay to generate a delayed gated wavelength, each second predetermined time delay determined in dependence upon the first predetermined time delay; and coupling the plurality of delayed gated wavelengths to a photodetector to generate the output serial electrical data.

2. The method of transmitting data according to claim 1, wherein delaying at least one of the plurality of wavelengths and the plurality of gated wavelengths comprises employing a 1×N tree-structure wherein all elements within each stage of the 1×N tree structure have a predetermined free spectral range (FSR) and each output of each element within the 1×N tree-structure has first and second predetermined time delay.

3. The method of transmitting data according to claim 1, wherein at least one of:

the first and second predetermined time delays applied to a wavelength are the same; and gating at the receiver comprising selecting a time window within the plurality of optical time-compressed WDM packets, and delaying at the receiver comprising delaying each predetermined wavelength within the optical time-compressed WDM packet with respect to each other by predetermined integer multiples of T/N seconds wherein T is the duration of the electrical serial data packet.

4. The method of transmitting data according to claim 1, wherein for the plurality of sub-slots the intra-card scheduler maps data associated with the received electrical signals from the plurality of ports for transmission at that input card of the plurality of input ports to a different sub-slot of the plurality of sub-slots; and for each sub-slot of the plurality of sub-slots the scheduler configures the optical interconnection network in dependence upon the decisions of the plurality of intra-card schedulers.

5. The method of transmitting data according to claim 1, wherein the gated plurality of wavelengths in the time-compressed WDM packet from the transmitter have a duration of T/N wherein T is the duration of the electrical serial data packet;

there are N wavelengths within the plurality of wavelengths; and each bit or plurality of bits of the electrical serial data packet is encoded to a predetermined wavelength of the plurality of wavelengths.

6. The method of transmitting data according to claim 1, wherein the optical network comprises an integer M N:1 combiners and an integer M 1:N splitters coupled to the M×M interconnection network.

7. An interconnection network comprising:

a plurality of M input cards, each input card having a plurality of input ports for receiving electrical signals for transmission from source device, an optical output connected to an input port of an optical interconnection network;

a plurality of M output cards, each output card having an optical input connected to an output port of the optical interconnection network and a plurality of output ports for transmitting electrical signals to destination devices;

the optical interconnection network comprising a M×M fast space switch;

an inter-card scheduler for controlling reconfiguration of the M×M fast space switch, the inter-card scheduler also in communication with the plurality of input cards;

an input card of the plurality of input card generating a plurality of time-compressed wavelength division multiplexed (WDM) packets, wherein each time-compressed WDM packet corresponding to a serial electrical data packet from an input port of the plurality of N input ports of the input card and for transmission upon a predetermined sub-slot of a plurality of sub-slots, wherein the predetermined sub-slot is determined by an intra-card scheduler in dependence upon the target output port of the plurality of output ports of a target output card and the target output card, where each of the time-compressed packets is generated by encoding serial electrical data from the corresponding input port of the plurality of input ports into parallel optical data at the optical output through the process of:

receiving an electrical serial data packet for transmission comprising a predetermined number of bits;

encoding each bit of the electrical serial data packet onto a predetermined wavelength of a plurality of wavelengths;

delaying each wavelength of the plurality of wavelengths by a first predetermined time delay;

multiplexing the delayed plurality of wavelengths by a multiplexer;

gating with a first gate the plurality of wavelengths to form a parallel optical time-compressed WDM packet, wherein the gated wavelengths are all aligned in time in the predetermined sub-slot; and a N:1 combiner combining and coupling to the optical output of the input card N optical time-compressed WDM packets each corresponding to one of the input port of the N input ports of the input card of the plurality of input cards, each optical time-compressed WDM packet in a sub-slot of the plurality of sub-slots;

the input card of the plurality of input cards transmitting the optical time-compressed WDM packets to the target output card of the plurality of output cards via the optical interconnection network which is established into a predetermined switching configuration by the scheduler; and the target output port of the plurality of output ports of a target output card generating an electrical output signal, wherein the electrical output signal is generated by converting at a receiver the optical time-compressed WDM packets to output serial electrical data through the process of:

receiving at a single optical input of the receiver the plurality of optical time-compressed WDM packets;

splitting, by a 1:N splitter, each of the plurality of optical time-compressed WDM packets into N portions each coupling to a second gate;

gating with the second gate the time-compressed WDM packet;

delaying each gated wavelength of the time-compressed WDM packet by a second predetermined time delay to generate a delayed gated wavelength, each second predetermined time delay determined in dependence upon the first predetermined time delay; and coupling the plurality of delayed gated wavelengths to a photodetector to generate the output serial electrical data.

8. The interconnection network according to claim 7, wherein delaying at least one of the plurality of wavelengths and the plurality of gated wavelengths comprises employing a 1×N tree-structure wherein all elements within each stage of the 1×N tree structure have a predetermined free spectral range (FSR) and each output of each element within the 1×N tree-structure has first and second predetermined time delay.

9. The interconnection network according to claim 7, wherein at least one of:

the first and second predetermined time delays applied to a wavelength are the same; and gating at the receiver comprising selecting a time window within the plurality of optical time-compressed WDM packets, and delaying at the receiver comprising delaying each predetermined wavelength within the optical time-compressed WDM packet with respect to each other by predetermined integer multiples of T/N seconds wherein T is the duration of the electrical serial data packet.

10. The interconnection network according to claim 7, wherein for the plurality of sub-slots the intra-card scheduler maps data associated with the received electrical signals from the plurality of ports for transmission at that input card of the plurality of input ports to a different sub-slot of the plurality of sub-slots; and for each sub-slot of the plurality of sub-slots the scheduler configures the optical interconnection network in dependence upon the decisions of the plurality of intra-card schedulers.

11. The interconnection network according to claim 7, wherein the gated plurality of wavelengths in the time-compressed WDM packet from the transmitter have a duration of T/N wherein T is the duration of the electrical serial data packet;

there are N wavelengths within the plurality of wavelengths; and each bit or plurality of bits of the electrical serial data packet is encoded to a predetermined wavelength of the plurality of wavelengths.

12. The interconnection network according to claim 7, wherein the optical network comprises an integer M N:1 combiners and an integer M 1:N splitters coupled to an M×M interconnection network.

* * * * *